United States Patent
Fox

(10) Patent No.: US 11,727,472 B2
(45) Date of Patent: *Aug. 15, 2023

(54) SYSTEMS AND METHODS FOR ENHANCED ORDER PREPARATION VIA INTEGRATION WITH AN ORDER DELIVERY SERVICE

(71) Applicant: Blue Baker, LLC, College Station, TX (US)

(72) Inventor: David C. Fox, College Station, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/989,555

(22) Filed: Nov. 17, 2022

(65) Prior Publication Data

US 2023/0078162 A1    Mar. 16, 2023

Related U.S. Application Data

(63) Continuation-in-part of application No. 17/532,077, filed on Nov. 22, 2021, which is a continuation-in-part of application No. 16/504,123, filed on Jul. 5, 2019, now Pat. No. 11,182,864, which is a continuation-in-part of application No. 15/168,952, filed on May 31, 2016, now Pat. No. 10,402,920.

(60) Provisional application No. 62/191,772, filed on Jul. 13, 2015.

(51) Int. Cl.
*G06Q 30/0601*   (2023.01)
*G06Q 10/083*   (2023.01)
*G06Q 50/12*   (2012.01)
*G06Q 20/18*   (2012.01)

(52) U.S. Cl.
CPC ....... *G06Q 30/0635* (2013.01); *G06Q 10/083* (2013.01); *G06Q 50/12* (2013.01)

(58) Field of Classification Search
CPC ... G06Q 30/0635; G06Q 10/083; G06Q 50/12
USPC ......................................................... 705/15
See application file for complete search history.

(56) References Cited

U.S. PATENT DOCUMENTS

| | | | |
|---|---|---|---|
| 8,059,029 B2 | 11/2011 | Juang | |
| 2006/0293971 A1 | 12/2006 | Hunter et al. | |
| 2014/0100971 A1* | 4/2014 | Klearman | G06Q 50/12 705/15 |
| 2016/0244311 A1* | 8/2016 | Burks | G06Q 20/18 |

\* cited by examiner

*Primary Examiner* — Garcia Ade
(74) *Attorney, Agent, or Firm* — Dickinson Wright, PLLC; Stephen A. Mason; Jonathan H. Harder

(57) ABSTRACT

Systems and restaurant locations for use with a mobile ordering system, and methods thereof, to provide at least more time-efficient pick up of orders by customers than with traditional ordering and pick up windows.

21 Claims, 14 Drawing Sheets

Order

| | Time/Price | |
|---|---|---|
| Pizza | 7 | $6 |
| Ham Sandwich | 2 | $6 |
| Cookie | 1 | $1 |
| Coke | 1 | $1 |
| Buffer | 3 | |
| Wait Time | 10 | $14 |

ID: B24
EDIT ◇
CONFIRM/Pay ◇

FIG. 2A

Order

| | Time/Price | |
|---|---|---|
| Hamburger | 2 | $4 |
| Ham Sandwich | 2 | $6 |
| Cookie | 1 | $1 |
| Coke | 1 | $1 |
| Buffer | 3 | |
| Wait Time | 5 | $12 |

ID: B24
EDIT ◇
CONFIRM/Pay ◇

FIG. 2B

SYSTEMS AND METHODS FOR ENHANCED ORDER PREPARATION VIA INTEGRATION WITH AN ORDER DELIVERY SERVICE

CROSS-REFERENCE TO RELATED APPLICATION

This application is a continuation-in-part of U.S. patent application Ser. No. 17/532,077, filed Nov. 22, 2021, which is a continuation-in-part of U.S. patent application Ser. No. 16/504,123, filed Jul. 5, 2019, now U.S. Pat. No. 11,182,864, which is a continuation-in-part of U.S. patent application Ser. No. 15/168,952 filed May 31, 2016, now U.S. Pat. No. 10,402,920, which claims the benefit of U.S. Provisional Patent Application No. 62/191,772, filed Jul. 13, 2015, and the contents and disclosures of all applications are incorporated herein by reference in their entirety for all purposes.

FEDERALLY SPONSORED RESEARCH

NOT APPLICABLE.

SEQUENCE LISTING

NOT APPLICABLE.

BACKGROUND

For many restaurants the preparation time significantly varies among menu items, and order completion time is determined by multiple dynamic variables including: staffing levels, staff position training, staff skill levels, prior orders in progress, inventory on hand, order size, order complexity, and by the longest preparation time of any one item on an order.

In some drive-through restaurants, customers are served in the sequence of order placement or arrival at the restaurant order queue (a sequential, linear queue) so there can be a significant wait in a queue for delivery of an order even if the preparation time is short, because the delivery is made in the sequence of orders received, not when the orders are ready for pick up. This results at least partially from the arrangement of drive-through parking lots with sequential drive lanes. Moreover, considerable time is typically spent in payment at the pick-up window.

What is needed is a system or methods which solves these time-wasting problems and allows customers the convenience of a more efficient drive through window, while potentially being served a higher quality menu items (such as those typically found in fast casual and casual restaurants), which require longer food preparation times, and further allows customers to receive a more reliable expectation of order completion.

FIELD

Apparatuses and methods consistent with example embodiments relate to drive-through, pick up, and delivery ordering and delivery systems and methods for restaurants, and more particularly to ordering and delivery in which an order completion time is determined.

DESCRIPTION OF THE RELATED ART

Customers of restaurants, especially to-go customers, do not wish to wait to pick up their food. In particular, customers who have pre-ordered their meals do not wish to be trapped in line waiting for other customers to order, or waiting on a larger order to be cooked and completed before picking up their food. This problem is especially pronounced as customers expand their expectations for more efficient pick up beyond fast food restaurants and to higher end restaurants.

For example, for fast casual and casual dining restaurants that offer customers the ability to pick up ordered food from a delivery or pick up window, time is of special importance. Customers do not wish to wait.

BRIEF SUMMARY

Example embodiments may address at least the above problems and/or disadvantages and other disadvantages not described above. Also, example embodiments are not required to overcome the disadvantages described above, and may not overcome any of the problems described above.

According to an aspect of an example embodiment, an ordering method includes: a processor receiving a customer order input, the order input including at least one ordered menu item; the processor obtaining a set of production timing and slip logic (PTSL) rules for generating an order completion time as a function of PTSL input including one or more of: the at least one ordered menu item, an estimated preparation time corresponding to the at least one menu item, a number of employees preparing customer orders, a number of customer orders currently in preparation, a number of menu items currently in preparation, and a summed estimation time corresponding to a sum of estimated preparation times corresponding to the menu items currently in preparation; the processor applying the PTSL rules and thereby calculating the order completion time; and the processor transmitting the order completion time to a selected external delivery system.

The at least one ordered menu item may comprise one or more of a food item and a beverage item.

The order input may further include a requested delivery time and a requested delivery location, and the PTSL input may further include at least one of: the requested delivery time and the requested delivery location.

The ordering method may further include: the processor selecting the selected external delivery system from a plurality of external delivery systems based on a determined proximity, at the order completion time, of an available driver to a preparation location of the at least one ordered menu item.

The ordering method may further include: the processor coordinating with the selected external delivery system and thereby identifying, based on the order completion time, a driver to pick up the at least one ordered menu item.

The ordering method may further include: the processor receiving, from the selected external delivery system, driver delivery information comprising at least one of: an identity of the driver, a vehicle of the driver, and a license plate number of the vehicle.

The ordering method may further include: the processor receiving, from the external delivery system, an estimated time of arrival of the driver.

According to an aspect of another example embodiment, an ordering system comprises: a memory storing instructions; and a processor communicatively coupled to the memory and configured to execute the instructions and thereby perform a method including: receiving a customer order input, the order input including at least one ordered menu item; obtaining a set of production timing and slip logic (PTSL) rules for generating an order completion time as a function of PTSL input including one or more of: the at least one ordered menu item, an estimated preparation time corresponding to the at least one menu item, a number of employees preparing customer orders, a number of customer orders currently in preparation, a number of menu items currently in preparation, and a summed estimation time corresponding to a sum of estimated preparation times corresponding to the menu items currently in preparation; applying the PTSL rules and thereby calculating the order completion time; and transmitting the order completion time to a selected external delivery system.

According to an aspect of another example embodiment, a non-transitory computer-readable memory stores thereon instructions that, when executed by a processor cause the processor to perform an ordering method including: receiving a customer order input, the order input including at least one ordered menu item; obtaining a set of production timing and slip logic (PTSL) rules for generating an order completion time as a function of PTSL input including one or more of: the at least one ordered menu item, an estimated preparation time corresponding to the at least one menu item, a number of employees preparing customer orders, a number of customer orders currently in preparation, a number of menu items currently in preparation, and a summed estimation time corresponding to a sum of estimated preparation times corresponding to the menu items currently in preparation; applying the PTSL rules and thereby calculating the order completion time; and transmitting the order completion time to a selected external delivery system.

BRIEF DESCRIPTION OF THE DRAWINGS

The above and/or other aspects will become apparent and more readily appreciated from the following description of example embodiments, taken in conjunction with the accompanying drawings. Like reference numerals refer to like parts unless otherwise specified.

FIG. 2A is a schematic view of a mobile device display of an example embodiment before editing an order.

FIG. 2B is a schematic view of a mobile device display of an example embodiment after editing an order.

DETAILED DESCRIPTION

Figure 1:
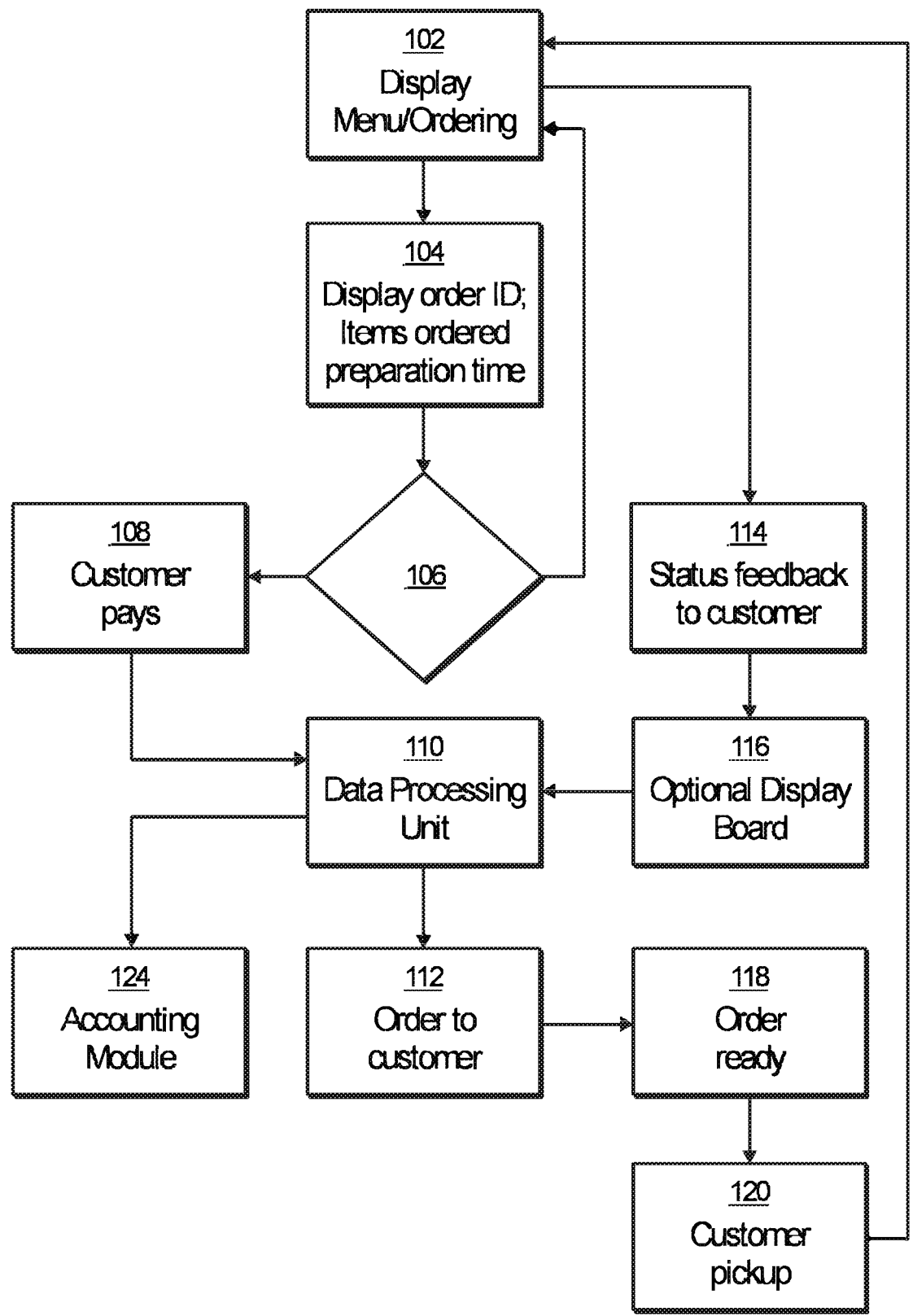
FIG. 1 is a flow diagram of a process of an example embodiment.

The following description of various example embodiments, combined with the associated drawings, enables persons of ordinary skill in the art to both practice the example embodiments, and to understand related applications and embodiments that may not be specifically set forth, but are encompassed by the specification and claims. In this regard, the example embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these exemplary embodiments pertain may not be described here in detail.

General Embodiment

According to an example embodiment, a restaurant location is provided for use at least with a mobile ordering system, and may provide at least more time-efficient pick up of orders by customers than with related art ordering and pick up windows.

According to an example embodiment, a restaurant location for use at least with a mobile ordering system, may include a restaurant building (which is, in various embodiments, a building, multiple buildings, a food truck, a food stand, some other discrete physical restaurant structure, or a combination thereof) having an order pick up window and associated order pick up area configured only for pick-up of pre-paid orders. The restaurant location may further comprise a parking lot at least partially around the building, and having a drive-through lane that allows vehicles to pull adjacent to the order pick up window. The restaurant location may also comprise a plurality of queuing spaces, being parallel, single-vehicle, parking spaces in the parking lot, each queuing space opening directly into the drive-through lane such that each queuing space provides independent, non-sequential access to the drive-through lane. The restaurant location may further comprise an order status display positioned and sized to be visible both to customers in the queuing spaces, and to customers in or approaching the drive-through lane but not yet approaching the order pick up window.

According to one or more example embodiments, each queuing space opens directly into at least one drive-through lane such that each queuing space provides independent, non-sequential access to that space's drive through lane, the order status display is positioned and sized to be visible to customers in the queuing spaces and to customers in or approaching a drive-through lane but not yet approaching the order pick up window; and a merging means to direct vehicles from the several drive-through lanes to approach the order pick up window.

According to one or more example embodiments, the restaurant location comprises at least one drive-through order placement station separate from and before the order pick up window and placed accessible from at least one drive-through lane.

One or more example embodiments may provide, but are not required to provide, an advantage in accurate expected wait times. In particular, one or more example embodiments may provide an advantage over a related art requirement for customers that desire an estimated wait time to call or walk-in to the restaurant location, and receive a mentally calculated estimate from wait staff. One or more example embodiments may allow customers to receive an estimated order-ready time before placing their order and without having to directly contact the restaurant.

One or more example embodiments may allow a more accurate order ready time, instead of either being inconvenienced by an over-ambitious estimate that may be too short and may require the customer to wait longer than expected, or by an overly-conservative estimate that unnecessarily discourages the customer from ordering.

According to one or more example embodiments, wait staff may greet the customer by name, verbally confirm the order, or some combination thereof, before handing the order to the customer. One or more example embodiments need not eliminate human interaction. Instead, frustrating human interaction (such as trying to accurately place an order over a drive-through microphone) may be limited, and one or more example embodiments may allow the human interaction to be more positive, such as greeting a customer by name and with a smile, and handing a fresh, accurate order to a customer.

According to one or more example embodiments, an ordering method includes: a processor receiving a customer order input, the order input including at least one ordered menu item; the processor obtaining a set of production timing and slip logic (PTSL) rules for generating an order completion time as a function of PTSL input including one or more of: the at least one ordered menu item, an estimated preparation time corresponding to the at least one menu item, a number of employees preparing customer orders, a number of customer orders currently in preparation, a number of menu items currently in preparation, and a summed estimation time corresponding to a sum of estimated preparation times corresponding to the menu items currently in preparation; the processor applying the PTSL rules and thereby calculating the order completion time; and the processor transmitting the order completion time to a selected external delivery system.

According to one or more example embodiments, an ordering system includes: a memory storing instructions; and a processor communicatively coupled to the memory and configured to execute the instructions and thereby perform a method including: receiving a customer order input, the order input including at least one ordered menu item; obtaining a set of production timing and slip logic (PTSL) rules for generating an order completion time as a function of PTSL input including one or more of: the at least one ordered menu item, an estimated preparation time corresponding to the at least one menu item, a number of employees preparing customer orders, a number of customer orders currently in preparation, a number of menu items currently in preparation, and a summed estimation time corresponding to a sum of estimated preparation times corresponding to the menu items currently in preparation; applying the PTSL rules and thereby calculating the order completion time; and transmitting the order completion time to a selected external delivery system.

According to one or more example embodiments, a non-transitory computer-readable memory storing thereon instructions that, when executed by a processor cause the processor to perform an ordering method includes: receiving a customer order input, the order input including at least one ordered menu item; obtaining a set of production timing and slip logic (PTSL) rules for generating an order completion time as a function of PTSL input including one or more of: the at least one ordered menu item, an estimated preparation time corresponding to the at least one menu item, a number of employees preparing customer orders, a number of customer orders currently in preparation, a number of menu items currently in preparation, and a summed estimation time corresponding to a sum of estimated preparation times corresponding to the menu items currently in preparation; applying the PTSL rules and thereby calculating the order completion time; and transmitting the order completion time to a selected external delivery system.

Exemplary Advantages

One or more example embodiments may provide, but are not required to provide, advantages over related art ordering, production, and delivery systems. A non-exhaustive, non-limiting, list of example advantages of some example embodiments is provided hereafter.

Menu Quality

One or more example embodiments may provide restaurants the ability to offer customers a combination of a higher quality menu typically associated with greater wait times, and the ordering and pick up convenience typically associated with lower quality fast food menus. Heretofore, restaurants with a high percentage of drive-through orders (typically greater than fifty percent) may have had to restrict their menu to orders that could be prepared quickly to prevent the line growing uncontrollably and excessive wait times between order placement and order pick up.

One or more example embodiments may allow longer preparation times, such as is necessary in home-cooking, in healthier menus, and in more customized or more variable menus, to be accounted for while preserving customer convenience, by pre-ordering. One or more example embodiments may allow the greater variations in preparation times associated with a varied menu to be accounted for by a production timing and slip-logic order system. Accordingly, a restaurant may prepare orders more efficiently, eliminating inefficiencies in order preparation time, orders not ready when expected, and orders ready substantially before expected. Such greater efficiency may allow the effect of longer preparation times to be minimized by removing overhead time that was lost in inefficiency in previous systems and methods, thereby reducing the impact of the longer preparation time on the time-to-ready that affects customers.

Customer Interaction and Convenience

One or more example embodiments may provide further advantages in accommodating customer personalities, moods, etc., and in providing customers with a more relaxed and friendly order placement and pick up experience. In particular, an ability to pre-order on a mobile device, computer, or kiosk, may allow a customer to explore the menu at their leisure instead of being pressured to quickly make decisions by other customers waiting behind them, or by a hurried wait staff waiting to receive their order. Indeed, one or more example embodiments, using a non-sequential order pick up lane and window, and a mobile ordering system, may enable an increased engagement of customers with the menu, increased amount of time customers spent creating an order, a greater level of customization, and an increased number of menu options added to orders.

Many customers are uncomfortable with excessive interaction: they may feel awkward; they may fear engaging a new restaurant because they are not familiar with it; they may tend to be introverted and prefer limiting unnecessary engagement with random people; they may have had a stressful day and not feel like the extra effort to engage people at the moment; they may be in a hurry and find it more efficient to interact with a device as it is convenient for them rather than dedicating the time to go place their order in person, etc. Whatever the reason, allowing pre-ordering, especially through a website, mobile device, etc., according to one or more example embodiments, may allow the customer to place an order without a) the stress of interacting with an often hurried order taker, and b) dedicating the time to place an order and wait for order preparation. A combination of slip-logic queuing, accurate estimation of order ready time, and notifying customers when the order is ready, according to one or more example embodiments, may enable pre-ordering to work smoothly and efficiently, without previous problems associated with pre-ordering, such as customers forgetting their order, losing track of time, or having to activate their order upon arrival and wait for the order to be prepared.

One or more example embodiments may offer advantages in convenience and speed, as referred to elsewhere herein. An order pick up window configured solely for pre-orders, especially mobile orders, may alleviate the frustration of pre-ordering, and then being trapped in line behind non pre-orders. Additionally, pre-ordering through a customer-centric mobile application or website may allow convenient re-ordering. For example, if a customer regularly places one or several orders, the customer is able, in some embodiments, to access their account and simply re-order instead of having to build the order time and time again, or to verbally dictate their order again and again to an order taker at a drive-through location.

Restaurant Advantages

One or more example embodiments may provide advantages to restaurants in increasing order accuracy, increasing customer service, and improving the working environment for staff, thereby contributing to a better experience for customers. In particular, the removal of microphones from the order pick up lane and window, in combination with mobile and online orders, may reduce the stress of understanding a customer's verbal orders, may increase order accuracy and so may decrease customer tension over inaccurate orders, and may allow wait staff to greet customers picking up their orders with a friendly, un-harried, smile and greeting. The reduction or elimination of phone calls seeking information and placing orders over the phone (due in part to direct mobile and online orders, and due in part to the ordering system, discussed elsewhere, allowing calls to be taken at a quiet, central location), may reduce the stress on wait staff, and may allow phone conversations to be in a quiet and calm environment without the background noise of a busy restaurant environment.

Mixed Pre-Order and In-Line Ordering

One or more example embodiments may provide an advantage over various systems and methods that seek to improve upon fast food ordering by taking pre-orders, and then mixing pre-order customers and customers ordering in-line in the same order and pick up line(s). In various example embodiments, taking orders over a mobile device or other internet-enabled device, calculating an accurate order-ready time, and managing order-prep start time with the slip-logic order management system may allow the customer to order when convenient, and pick up when convenient, avoiding extended wait times and making a higher quality menu actually faster for the customer than present fast-food systems and methods. As customers demand higher quality menus, and menus including healthier options, such example systems and methods may be advantageous to customers and restaurants alike.

One or more example embodiments may provide an advantage over systems and methods that take pre-orders, but provide no dynamic order queuing, production timing, or slip logic, such that large or slow orders may interfere with expected wait times, and small or fast orders may sit abnormally long before the customer picks them up. Again, one or more example embodiments may also provide an advantage over systems and methods that take pre-orders but, in order to maximize order freshness, require the customer to activate or confirm the order upon reaching the restaurant location, effectively eliminating the advantage of pre-ordering to avoid the wait of order preparation. One or more example embodiments may, thus, capitalize on the advantages of pre-ordering, rather than effectively putting pre-orders in the same preparation position as if the orders were placed at the window.

Non-Sequential Linear Access

One or more example embodiments may provide multiple advantages over drive-in restaurants with multiple parallel ordering and pick up spaces. Non-sequential customer access to a drive-through window(s) may maximize efficiency of wait staff, preventing the necessity of constantly carrying orders to a plurality of locations. Additionally, non-sequential customer access to a drive-through window(s) may maximize convenience and time savings for customers, eliminating the need to wait at a particular location for the order to be prepared—an advantage over restaurants where the customer places and receives the order at the same window or parking space, and has to wait thereat during preparation.

Efficiency

One or more example embodiments may provide advantages over order delivery methods in which the customer places an order, and the customer is directed to pull to a parking location and wait for the order to be brought to them. Non-sequential customer access to a drive-through window may allow wait staff to work in an efficient manner from inside the building, thereby reducing per-order time and cost, decreasing customer wait time, and preventing inefficiencies and potential dangers (moving vehicles, low-light locations at night, etc.) from requiring wait staff to exit the restaurant repeatedly to carry orders to waiting vehicles. Additionally, pre-placement of an order through a mobile device and/or online ordering system, may prevent the necessity of the customer waiting for the order to be prepared.

Various combinations of different aspects of example embodiments as herein described will be obvious to those of skill in the art as appropriate for the specific application and environment of use.

System and Method Components

One or more example embodiments may include the following components.

Ordering System

According to an example embodiment, a production-timing and slip-logic mobile ordering and order management system is provided. A particularly suitable such system, incorporated in one or more example embodiments described herein, is described in patent publication US 2017/0018041 A1, published Jan. 19, 2017, the disclosure of which is incorporated herein by reference for all purposes. Further details regarding the ordering system is provided, as relevant, herein, particularly in relation to the detailed description of the figures.

"Mobile ordering system," as used herein, is defined as a system that provides customers with the ability to place an order via a mobile device. "Mobile device," as used herein, encompasses stationary computers that are able to remotely access a system—such as a desktop personal computer connected to the internet. Some mobile devices described herein may be literally mobile—such as able to be carried in a user's hand, vehicle, about the human body, etc.—as indicated expressly or by context, such as for dynamically tracking customer location. Such mobile devices include, but are not limited to, smartphones, tablets, laptops and notebooks, smart watches, vehicle-integrated processing and connectivity systems, and other suitable devices.

Non-Sequential Order Pick Up Window

According to one or more example embodiments, a restaurant location comprises at least one non-sequential order pick up window (unless specified otherwise, also referred to herein as "order pick up window," or "pick up window," and sometimes abbreviated when repeatedly used simply as "window"). It should be noted that, as used herein, "order window" is defined as a general term that includes order pick up windows, order payment windows, order placement windows, or any order-related window, unless otherwise indicated explicitly or by context. An order pick-up window is a type of order window.

A non-sequential order pick up window is configured for customers to come to the window and pick up their order in the sequence that the order is ready, and not necessarily in the sequence that the order was placed. According to one or more example embodiments, the order pick up window is used to deliver orders to customers that have already both placed and paid for their order online (including through a mobile device). According to one or more example embodiments, the order pick up window does not have a microphone, and does not accept payment for orders. According to one or more example embodiments, the restaurant location does not have any microphone for customers in the parking lot to communicate with the restaurant staff. According to one or more example embodiments, there are no sequential queues in the parking lot.

"Non-sequential," as used herein, unless otherwise indicated, is defined as referring to a lane, order pick up window, etc. that: (a) is not necessarily entered or approached in the sequence of order placement, or of customer arrival at the restaurant location but, instead, (b) is accessed in the sequence of order pick up, or at least of attempted order pick up by the customer, which may be the sequence determined by the intersection of when the orders are ready and when the associated customers arrive. In other words, a non-sequential lane may be entered and a non-sequential order pick up window may be approached, for example, when: (a) the customer is present at the location, and (b) an order-ready board (or other order-ready notification system) indicates to the customer that their order is ready for pick up.

Non-sequential queuing spaces or lanes, and non-sequential parking spaces, however, are typically entered when a customer arrives, allowing the customer to wait conveniently for a notification that their order is ready. Such spaces and lanes are still non-sequential in the sense that they do not block other customers from entering the non-sequential drive-through lane or approaching the non-sequential order pick up window, thereby preserving efficient customer flow and reducing or eliminating unnecessary wait time because of sequential, linear queuing.

According to one or more example embodiments, no orders are taken at the order pick up window. Orders and payment may be received at the order pick up window, but the customer may be required to exit the lane accessing the order pick up window and wait to be notified (such as by the order board) that the order is prepared, before re-approaching the order pick up window. Such example embodiments provide service to customers who do not have access to a mobile device, eliminate the need to go inside to place an order (whether for convenience of the customer or because the restaurant has no area inside for receiving orders) while preserving the efficiency of non-sequential access to the order pick up window.

According to one or more example embodiments, the restaurant location does not have any microphone for customers to communicate with wait staff. Customers place their orders in various embodiments, through a mobile device, through a web site, inside the store, at a kiosk, with an attendant in the parking lot, or—in relatively limited circumstances—at the order pick up window. Eliminating the microphone allows the restaurant to focus on accurate order preparation instead of trying to accurately hear and interpret customer orders, thereby eliminating a potential source of error. Eliminating the microphone encourages pre-ordering by customers, and the associated advantages discussed herein, including convenience and speed for other customers.

According to one or more example embodiments, order-placement stations are provided in the parking lot, inside the restaurant, at other convenient locations (such as a mall, grocery store, retail store, office building, industrial center, bus stop, food park, school, university, conference center, visitor center, travel center, convenience store, etc.). The order-placement stations may be kiosks, staff, or third-party personnel or equipment. The order-placement stations may also accept payment through at least one of: credit cards, debit cards, automated clearing house system, electronic funds transfer, cash, bitcoin, other electronic funds, or some combination thereof. Customers who approach an order-pick up window to place an order may be directed to order online, with a mobile device, inside the restaurant, or at an order-placement station.

Order Notifications

According to one or more example embodiments, customers are provided with various order notifications through the ordering system, a notification system, an order-ready board (discussed hereafter), etc. Customers may be provided with notifications on their mobile device, in their vehicle, through short message service (SMS), electronic mail (e-mail), etc. Customers may be provided with a mobile device notification, an SMS notification, or both, when at least one of the following occurs: their order is within a given time of being ready, or their order is ready. Customers may receive a mobile device notification, an SMS notification, or both, when their order is ready.

Order-ready notifications may be important to non-sequential order pick up, as they may discourage customers from entering the order pick up lane until the precise time their order is ready. This may provide increased time convenience for customers, and minimize the length of customer queues. As discussed elsewhere herein, minimizing the number of customers in a lane at a given time may decrease customer wait time, and may minimize required real estate for a restaurant location.

Pre-Ordering and Pre-Arrival Production

According to one or more example embodiments, an ordering system allows, encourages, or requires, pre-ordering, or placing an order before entering the order pick up lane. The ordering system may allow, encourage, or require offsite (or at least outside of the pick-up lane(s)) placement of orders and payment for orders. Pre-ordering (typically also including pre-payment) allows the restaurant location to begin production before customer arrival, minimizing customer wait time and increasing restaurant and traffic efficiency.

According to one or more example embodiments, as discussed further elsewhere herein, a location providing only a non-sequential order pick up window, requiring (or at least highly encouraging) pre-ordering and pre-payment, may reduce the amount of parking lot needed, as it can be treated like a pick up window (such as a laundromat) for planning and relevant city code purposes. For example, in one example embodiment of a restaurant location serving a high-quality, highly-customizable casual restaurant menu, in a metropolitan area of approximately two hundred seventy-three thousand (273,000) people, anecdotal observation indicates that there are never more than two (2) or three (3) customers in a row at the order pick up window, even at highly busy times.

Furthermore, pre-ordering online, through a mobile device, etc. allows customers to more fully review the menu without time and embarrassment pressures, and to place the order without time and microphone and language or accent constraints. Accordingly, higher levels of customization and drastically reduced order mistakes are simultaneously possible.

Order-Ready Board (ORB)

One or more example embodiments may comprise, or comprise the use of, an order-ready board (ORB) or similar order status display structure for notifying customers when to advance to a non-sequential pick up area. The ORB may be positioned such that it can be viewed when approaching a non-sequential drive-through pick up lane, from queuing parking spaces and/or lanes, and from at least some portions of the parking lot in general. The ORB presents at least the orders which can be picked up, using some form of identification which may be readily discerned by customers. It may alternatively or additionally present the orders for which customers should approach the pic-up area(s) (e.g., at least one window), even if the order is not actually ready yet.

Such an ORB is not a menu, such as display some or all of a restaurant's menu options, and from which customers determine what they are going to order. However, according to one or more example embodiments, a single structure may comprise at least one each of an ORB and a menu. Conversely, in some example embodiments, an ORB does not function as a menu in any capacity, and is not combined with any menu. Furthermore, the ORB is not required to be connected to a microphone, and so cannot broadcast a verbal announcement of an order number, a customer's name, etc.

According to one or more example embodiments, the ORB may be provided in combination with a means for SMS messaging, mobile device notifications, e-mail, or another form of electronic messaging notification. The customers may choose to rely primarily on looking at the ORB to know when to advance to the order pick up area(s), may rely primarily on the electronic messaging notification, or some combination thereof. All pending orders may be presented on the ORB, and customers are able to verify that their order is in process by looking at the ORB.

According to one or more example embodiments, the ORB may be configured to protect identity, to combat theft of orders, or both. The ORB may display at least one of: an order identification alphanumeric string, a customer-provided nickname, and a customer provided order identification string. Such example embodiments need not display a customer's actual name, phone number, or other sensitive information that may be used to breach the customer's security if publicly displayed. An additional piece of information, such as a confirmation string, a name, a phone number, or other information associated with the order and/or customer, and not made public on the board, may be required before delivery of the order. Such example embodiments prevent an order from being stolen by being seen on the ORB by a passerby and then being picked up.

An ORB may also be referred to as an order status display which, in various embodiments, displays orders that are ready, displays the status of all pending orders, or other suitable order status display configurations.

Detailed Description of the Drawings

FIG. 1—Ordering Process

Referring to FIG. 1, according to an example embodiment, a process starts at 102 where customers access a menu of available items. The menu will generally be available on an interactive website or mobile application (app) that can be accessed by customer through his/her mobile device (cell phone, computer tablet, computer, and the like). Customers (guests) can place orders from anywhere—allowing them to plan ahead and pick up later. This allows other occupants in a vehicle to place the pick-up order while the vehicle is moving towards the restaurant. The menu display also includes means for the customer to indicate the desired pick up wait time ((for example: as soon as possible (ASAP), 10 minutes, tomorrow, etc.)).

FIGS. 2A-2D—Order System Screens

Figure 2D:
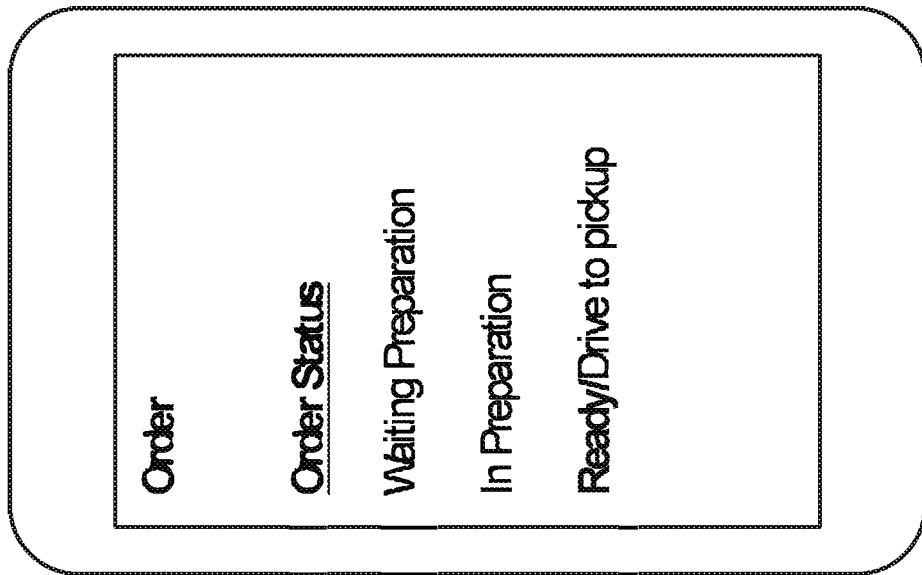
FIG. 2D is a schematic view of a mobile device display of an example embodiment showing status of an order.

According to various example embodiments, shown in FIGS. 2A-2D, when the customer accesses the menu, a customer identification (ID) is generated by a data processing unit, or the customer uses an existing unique ID number or code. When the customer selects items from the menu for orders that are wanted ASAP, there is generated and displayed on the customer's mobile device or computer the menu items selected, the price and the preparation time for each item, and the preparation time plus indicated wait time, as illustrated in FIG. 2A and FIG. 2B. Thus, the customer can see (104 display on customer's mobile device, see also FIG. 2A- or appropriate computer screen) if the preparation for one or more items is excessive for his or her needs and can edit the order accordingly. The system data processor(s) will calculate all the variables.

If a particular item on the order could be deleted, allowing the order to be produced more quickly, then the system will highlight that item and inform the customer how much time could be saved by not ordering that particular item. If no item can be deleted to save preparation time, then no indication will be displayed. The display may also display an appropriate message such as "Your Order's Wait Time will be X minutes. To shorten your Wait Time, remove the highlighted item(s) below."

The display may also show a "Promised Time". For example, preparation time for pizza may be 7 minutes, and all other items (drinks, sandwiches, bagged chips, and the like) only 1-2 minutes, as illustrated in an example mobile device display in FIG. 2A. Thus, the customer may edit the order, for example, delete pizza, and select another item with shorter preparation time (see 106 to 102 of FIG. 1), such as is shown in FIG. 2B, where pizza is deleted and hamburger is selected.

Figure 2C:
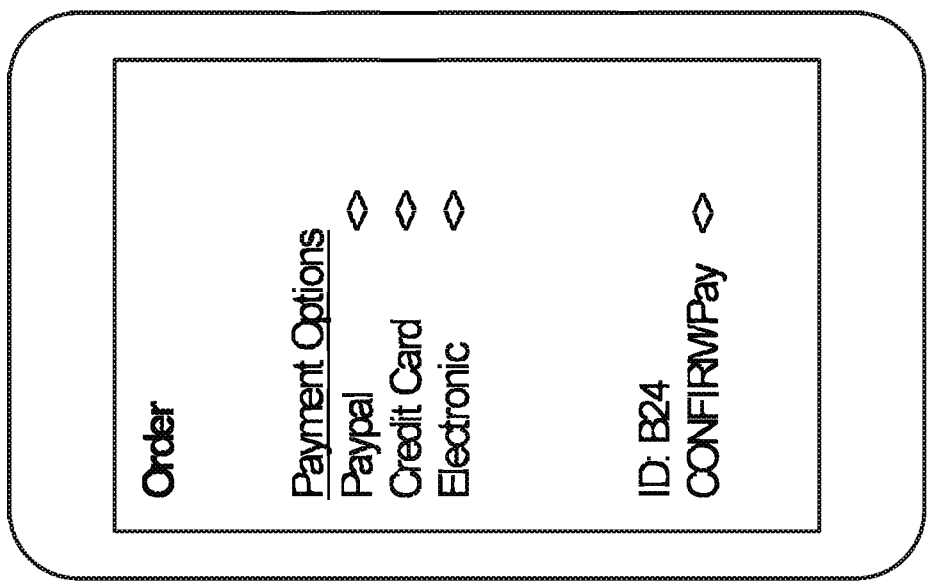
FIG. 2C is a schematic view of a mobile device display of an example embodiment showing payment options.

The order is confirmed or edited. If edited (as illustrated on FIG. 2B) it may then be confirmed. When confirmed, 106 (decision connector) to 108 (customer payment module), the order and cost is displayed (FIG. 2C) and the customer is asked to make required payment, as illustrated in FIG. 2C. The order status will be periodically or continuously updated (FIG. 2D). There will also be an indication on the customer's device screen that the "order is ready." For future planned orders where a customer selects a specific time slot and day, the system will determine whether or not the order can be produced (and delivered) by the time requested, and inform the customer on its device screen. No production times will be displayed.

When the customer selects items from the menu, there is generated and displayed on the customer's mobile device or computer the menu items selected, the price and the indicated total wait time. Also displayed, next to any one item in the order, is the amount of wait time that could be removed from the total wait time by removing that one item (which has a longer production time associated with it) from the order. Thus, the customer can see (104 display on customer's mobile device, FIG. 2A) if the preparation for one or more items is excessive for his or her needs and can edit the order accordingly. For future planned orders the customer selects a specific time slot and day. The system will determine whether or not the order can be produced (and delivered on time) by the time requested. In this scenario, no production times will be displayed because they do not matter.

As noted above there is also provided means, according to one or more example embodiments, for customers to enter a unique customer ID number or code upon placing an order (for example, to create an account).

This identification number or code may facilitate speedier service and allow identification of repeat and frequent customers. Customer's payment types, past orders and favorites are remembered by the system, thus, making reorder quicker and more convenient compared to traditional drive through windows.

The wait time for as soon as possible (ASAP) orders and time slots allowed for future orders may be based on an algorithm that factors multiple variables. Variables include (but are not limited to):

ASAP or promised time(s) of prior orders and the current production progress of each of those prior orders
Order size
Order item complexity
Production staff levels
Delivery staff levels
Skill levels of staff members
Delivery distance of prior and current orders The system, with a customer identification, is programed, according to one or more example embodiments, to allow frequent, loyal, very important person (VIP) guests to jump ahead of the line and for their order to receive preferential timing. The system may also be configured to allow guests to pay an extra fee to receive their order quicker. It may also allow for a "Free if Late" promotion, other promotions, or some combination thereof. The system contains a management tool for measuring and tracking promised times versus actual fulfilled delivery and pick up times.

According to one or more example embodiments, only electronic payment from a customer's mobile or computer device connected by the internet (or other distributive computing method or connectivity method) is accepted as payment. There are many mobile payment systems available and more are being developed all the time. These include, but are not limited to Square Wallet™, virtual prepaid cards, Google Pay™ Apple Wallet™, Android Pay™, Dwolla™, and the like. There may be provided a kiosk at the restaurant location for payment by credit card, cash, other payment means, or combinations thereof. Also, there may be provided a customer service representative (order taker) in the location parking lot that will have a mobile device for taking orders and payments.

In addition to displaying the menu or ordered items there is provided, according to one or more example embodiments, an interactive sensor (usually a button) on the menu display on the customer's mobile device or computer that will allow nutritional information for the menu or ordered items to be displayed. The nutritional information may contain various diet points, such as used by diet services as, for example, Weight Watchers™, Jenny Craig™, NutriSystem™, and the like. The information is stored in data storage in the Data Processing Unit or other suitable accessible data storage, and is accessed by the appropriate computer program of the computer system.

Kitchen orders may be prepared by the preparation staff in parallel, not necessarily in linear sequence, as determined and arranged by an algorithm of the data processing unit. The system algorithm determines which order to make next and dictates promised completion times. Simple orders and preferred guests' orders are moved forward in progression. Multiple orders are worked simultaneously. When orders are complete, the customer is notified and the order preparation algorithm is updated to calculate a new preparation display for the preparation kitchen staff. When the order is ready the customer is notified (112) (FIG. 2D) by visual display (FIG. 2D) or text message on his/her mobile device or computer, or by any other suitable means, and the customer moves to an order pick up window 120. An order placed for delivery also receives a text message on his/her mobile device or computer, or by any other suitable means, to notify them that a delivery driver has departed from the restaurant with their order and gives them an updated arrival time based on current traffic conditions available on various internet sites.

Thus, there is no sequential waiting for order pick up: the order is picked up when ready and, since the order is prepaid, no wait is necessary for payment and change making. This is facilitated by the arrangement of the location physical layout explained in more detail below.

The data processing unit or module 110 may be considered to be a computing and data generation heart of the system. It contains suitable data storage capacity for menu items, prices, preparation time, customer identification, order details, payment details and the like. It is capable of computing preparation wait time and pre-preparation times from inputted and stored data and causing the resulting information to be displayed on customers' devices and display panels 116 for customers and preparation personnel.

The data processing unit and associated data storage may be, but is not limited to a computer programed and running software to perform the functions described. Implementation of such a data processing system is well within the capabilities of those skilled in the art.

Figure 3:
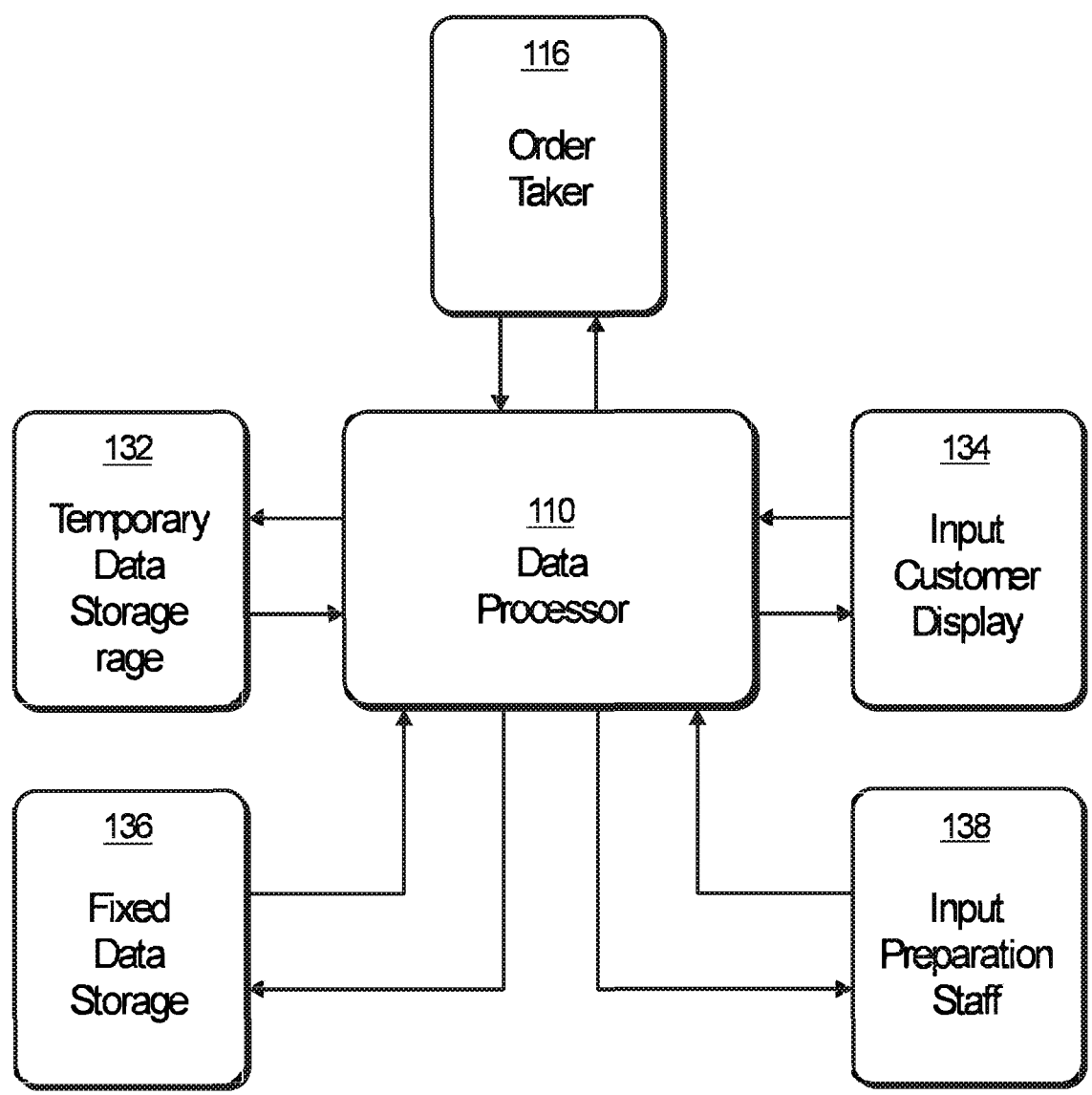
FIG. 3 is a flow diagram of a process showing data flow in a data processing unit, according to an example embodiment.

FIG. 3—Ordering System

FIG. 3 illustrates a flow process diagram of functions of a data processing unit, according to an example embodiment. The computing data processing unit 110 of the system will receive or access data from fixed data storage 136 and write to the data storage system. The data, such as menu items, prices, preparation time, and the like, are fixed in the sense that they are not immediately variable.

The system may include a mechanism allowing a manager to log in and mark any item, such as "Sold Out," so that customers cannot continue ordering an item no longer in stock. The data may be updated as often as needed and there are means for updating the data, such as, but not limited to a management or administrative unit allowing for input, for changes in data storage, and for receiving data output (see FIG. 5). Temporary, calculated, and intermediate calculation values are stored in data storage unit 132, and can be accessed and written to by the data processing unit 110. For example, the preparation time is affected by staff levels and skill levels in the algorithm.

Customer input 134 may include ordered item, edits, delay or requested wait time, and the like. Order taker(s) 116 provides input/output. These staff members may be located at a call center, or in a restaurant, and will take orders by phone from customers and enter into the system.

The order takers may be assigned to roam the parking lot of a restaurant location and take orders from customers in cars. Input from the preparation staff 138 may include start time, order ready information, and continuous update of order status.

There is also provided a means for the preparation staff and order administration/management to input data on orders that are being processed. These may include, but are not limited to, individual computer tablets, or the equivalent or larger display panels, that will have data on customer ID, ordered item, requested delay time, and calculated preparation order sequence. It may not expedient for the preparation staff to use touch or keyboard inputs, but foot operated input devices may be suitable. Voice control input to suitable receivers may also be used. There is an abundance and variety of voice activated/control technology available which can easily be adapted for use in the system.

The data processor 110 will calculate information and send it to the appropriate location. Communication between the data processor 110 and a customer's display 134 or preparation staff 138 may be wireless or wired. The data processor 110 and data storage 132 may be part of a dedicated system or may be operated in conjunction with a remote shared distributive computing ("the cloud").

FIG. 4—Parking Lot

Figure 4:
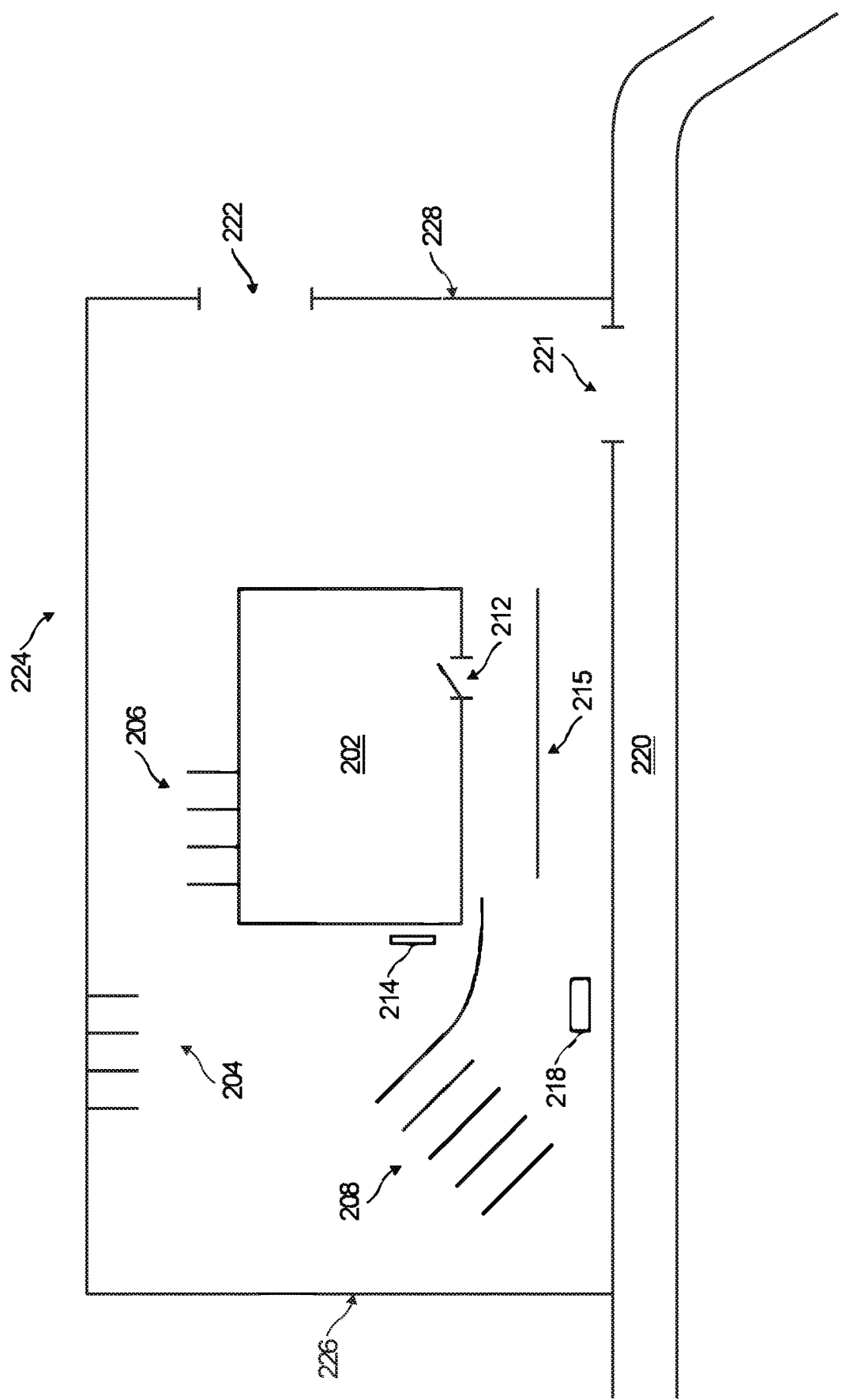
FIG. 4 is a schematic representation of a restaurant building and parking layout for an example embodiment.

FIG. 4 illustrates a restaurant/lot arrangement according to an example embodiment. FIG. 4 illustrates a restaurant building 202, an order pick up window 212, customary parking spaces 204 and 206, and a plurality of non-sequential parallel single vehicle parking spaces 208 for cars placing orders and awaiting order ready notification. An access road 220 has lot entrances 221 and 222. The side by side non-sequential single vehicle parking spaces 208 have access to a non-sequential drive through lane 215 leading to the non-sequential pick-up window 212. This may allow customers to: a) not feel rushed when placing an order because no car is behind their vehicle waiting to order; and b) proceed to the pick-up window 212 immediately when their order is indicated as ready without the potential wait that can be caused in a traditional drive-through by other customer's queued vehicles in front of them awaiting their orders' production and completion. This may reduce waiting time and improve the ordering experience. Having payment prior to pick up may also reduce wait time and make the entire process more efficient. Lot perimeters 224, 226 and 228, an ORB 214 are also shown. The ORB 214 may be used in one or more example embodiments for displaying customers order ready information. A payment kiosk 218 may also be provided.

Customers (guests) may enter the lot and park in the customary parking spaces 204, 206, or in the non-sequential single vehicle slanted spaces 208, as they desire. Menus are displayed on customer's mobile devices, or computers through the internet or other suitable distributive computing/communication system, and orders are made and processed when customers are at any location. Orders may be entered before the guest enters the parking lot, scheduled for times in the future, etc. Customers wanting immediate, "as soon as possible" (ASAP), service may be located in the parking lot, be prepared to depart their current location for the restaurant, or be headed towards the restaurant lot. The most expedient location will be the slanted non-sequence single vehicle spaces 208. Customers without the ability to pay by mobile device may drive by the optional kiosk 218 and pay with cash or credit card or may pay via an optional attendant that roams the parking lot to take orders and payment.

Figure 5:
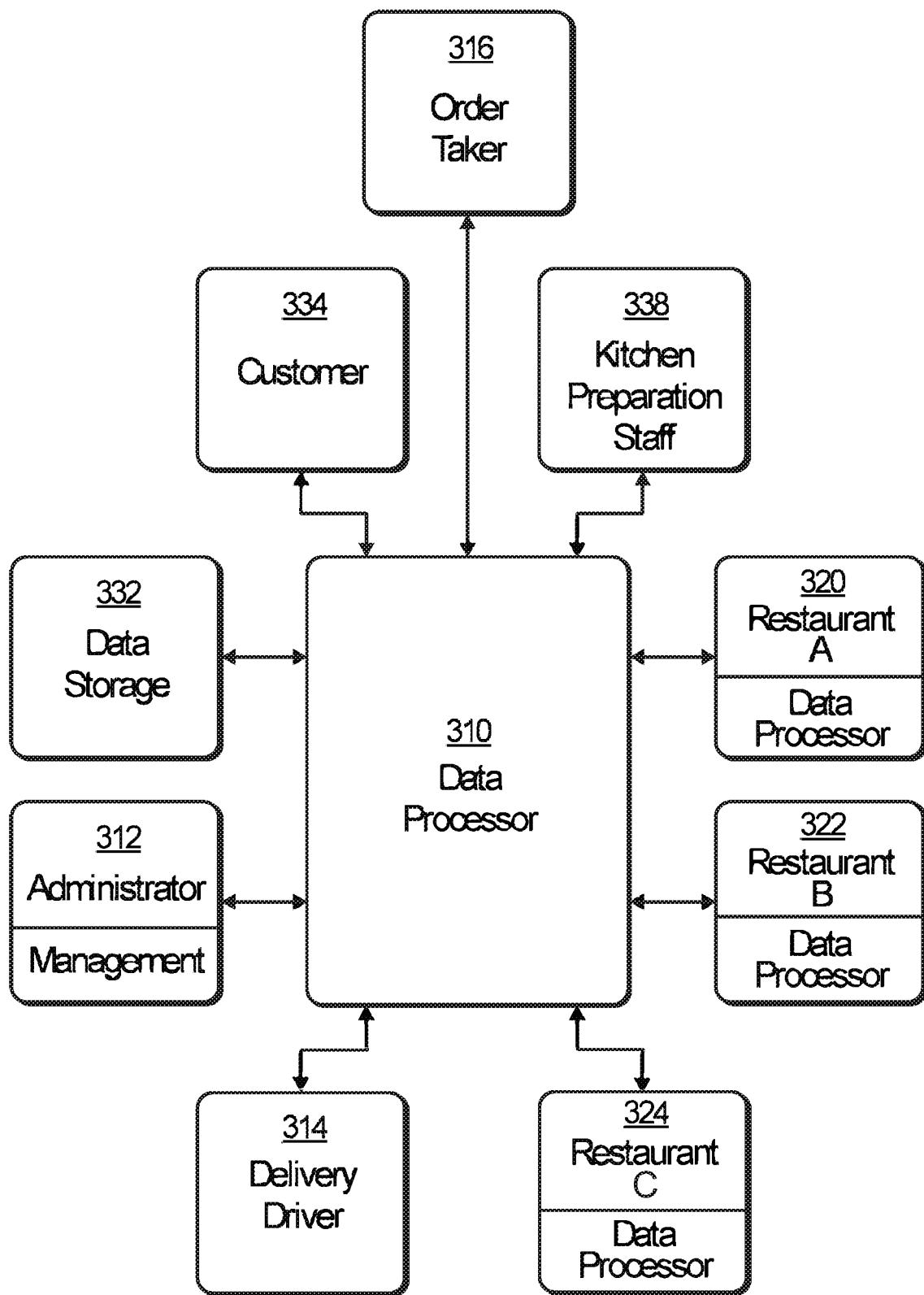
FIG. 5 is a flow diagram of a process of an example embodiment.

FIG. 5—Multi-Location System

According to one or more example embodiments, a system may interconnect more than one restaurant (store) unit into a combined system and connect to a data processing unit, and may provide a complete feedback loop between the data processing unit and each restaurant. An example embodiment of such a system is illustrated in the flow diagram of FIG. 5.

According to this example embodiment, the multi-location system allows routing of order preparation to the most efficient location, where possible. This may be helpful for scheduling and preparing pre-scheduled and delivery orders. Each restaurant unit, 320, 322 and 324, may have its own server (data processor) that will be able to communicate with the central data processor 310. The order data may originate on the data processor 310 which may host a website, ordering system, or application. The order data may then be to the appropriate store server. The data processors of each individual restaurant 320, 322, 324, may transmit and receive data back and forth to the central data processor 310 to enable updating of an overall order queue timing of current orders.

Each restaurant unit, 320, 322 and 324, has the ability to adjust certain timing variables based on current in-unit conditions to increase or decrease wait times displayed to guests currently ordering. The system may access in-unit schedules and staff positions and skill levels to determine a team's productive capacity at any given time interval on any given day. An administrator or management 312 is connected to the data processing unit 310 to allow administrative input and to be able to obtain real time and calculated information of operations. Inputs include, pricing, staff level at each location, order status, prescheduled and delivery orders, etc. The system also allows for delivery drivers 314 to be re-routed from one store pick up location to another store pick up location by a central logistics control mechanism factoring in variables to shorten the overall wait time for customers 334.

Manager(s) can login and update the system regarding current staff levels and in store conditions so that adjustments to timing may be made; for example, sick staff members, delivery driver in vehicle accident, etc. The system will also allow managers 312 to manually increase or decrease wait timing to slow or speed up order inflow. The system will supply data from future guest orders (for tomorrow, two days out, etc.) to kitchen/bakery production software and vendor inventory ordering software to help better prepare product quantities for future work dates. FIG. 5 illustrates the system having multiple stores interconnected according to an example embodiment. The data processing unit 310 and data storage units 332 may be central (on-site or cloud), and may receive inputs and provide data and output to each of the interconnected restaurants A 320, B 322, and C 324. It can receive and provide data (directions etc.) to a delivery driver (or drone) and provide order information to kitchen preparation staff 338 or to the administrator or management 312.

Order taker(s) 316 are an optional input/output source. The order takers 316 may be staff members located at a call center or in a restaurant, and will take orders via phone, chat, etc. from customers 334 and enter the orders into the system. They may also roam the parking lot and take orders from customers 334 in cars. This may allow orders by those customers 334 who do not wish to use their own mobile devices. It may also allow better customization of future orders, as the order takers 316 may be able to gather and input to the system identification data such as the customer's name, phone number, credit card number, automobile license plate number and the like to make the ordering process more convenient for customers 334.

For example, a customer's vehicle license plate number may be saved to a customer's user profile so that staff members will know the customer's name, have stored payment information tied to the account, see the customer's favorites, past orders, etc., as they approach the customer's car. This may make the ordering experience more convenient for the customer. With payment types stored to the customer profile, on return visits in the same car, customers will not need to physically provide their credit card. In some example embodiments, the restaurant location is provided with at least one license plate reader, camera, or similar technology, to allow restaurant staff, the ordering system, or both to identify the customer or the customer's vehicle before the customer arrives at the order pick up window.

According to one or more example embodiments, a system and process for managing and scheduling an order in a restaurant with both pick up business and delivery business is provided. Scheduling take-out orders and delivery orders in the same preparation location (kitchen) may be made more efficient while reducing wait time on pick up orders. This management process may function analogously for pick up orders, except that driver pick up, driver time availability, and various orders' delivery locations proximity to each other may be taken into account in a data processor 310 to determine the scheduling of preparation and calculate delivery time. This allows proximate orders to be clustered with one driver to speed up overall times. Driver location and arrival time may be displayed on a delivery customer's computer or device in the same manner as for pick up customers.

Figure 6:
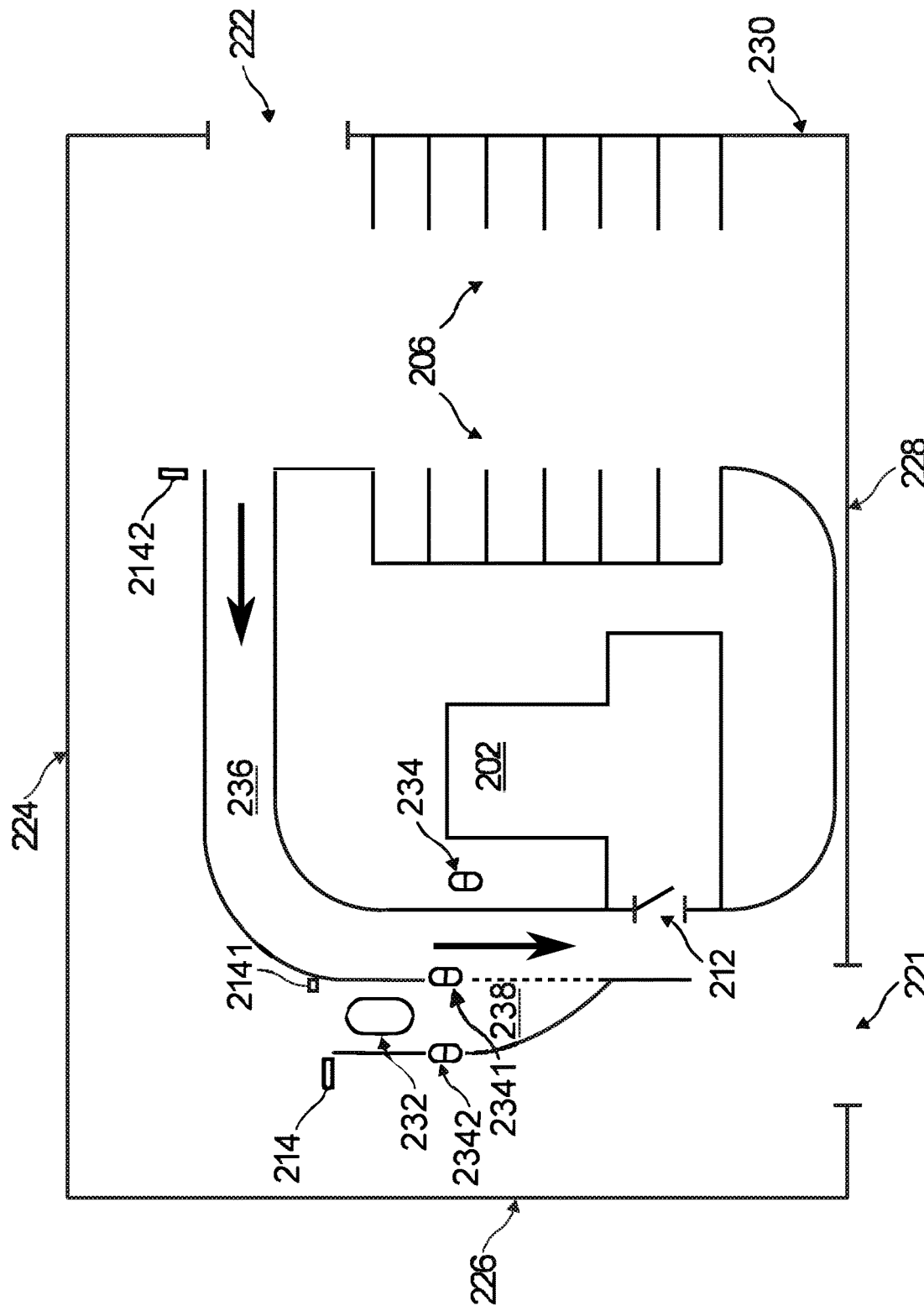
FIG. 6 is a schematic representation of a restaurant building and parking layout for an example embodiment.

FIG. 6—Another Parking Lot

FIG. 6 illustrates a restaurant/lot arrangement according to an example embodiment, including a restaurant building 202, an order pick up window 212, and customary parking spaces 206. The restaurant may be a traditional restaurant with a sequential drive-through order lane 236, such as at a menu board with a microphone (not shown), with an additional non-sequential drive-through pick up-only lane 238 accessing a single order pick up window 212. Payments may be accepted at window 212, or may not be accepted at window 212.

Customers enter by lot entrance 222 and leave by lot exit 221. There may be side by side, non-sequential, single vehicle parking spaces (not shown), with access to the non-sequential drive through lane 238 leading to the pick-up window 212. Lot perimeters 224, 226, 228, and 230 and an ORB 214, for displaying customers' order ready information, are also shown. An ORB 2141 may be narrower, and vertically-oriented, and used alternatively or additionally to the ORB 214. An alternate ORB 2142 may also be used.

Pre-order customers (guests) may enter the lot and park in the customary parking spaces 206, or the non-sequential single vehicle slanted spaces (not shown), if provided, as they desire. Menus are displayed on customer's mobile devices, computers through the internet, or other suitable distributive computing/communication system. Pre-orders are made and processed when customers are at any location. Pre-orders may be entered before the customer enters the parking lot, scheduled for times in the future, etc. Customers wanting immediate, ASAP, service when pre-ordering may generally be located in the parking lot, be prepared to depart their current location for the restaurant, or be headed towards the restaurant lot.

Customers who wish to drive through and have not pre-ordered, and do not wish to place mobile or online orders, are referred to herein as order-in-line customers. Such customers will enter sequential drive-through lane 236, and will typically place their order at a microphone-equipped menu board (not shown), previous to stop-go light 234, 2341, or 2342. Stop-go light 234 indicates to order-in-line customers whether they may proceed in the drive-through lane 236 to the order pick up window 212. Stop-go light 2341 may be used in conjunction with any example embodiment.

Pre-order customers may enter non-sequential drive-through lane 238, when their order is ready, as seen on at least one ORB 214, 2141, 2142.

A customer presence detector 232 detects when a vehicle is present in lane 238, and staff inside restaurant location 202 are notified. In some example embodiments, stop-go light 2342, stop-go light 2341, or both, indicate to non-sequential pre-order customers whether to merge in to lane 236 and approach the order pick up window 212. In some example embodiments, wait staff are also provided with customer identification, as discussed elsewhere herein—such as a license plate reader, notification from the customer's mobile device, etc.—in order to have the appropriate order already located and waiting at the window.

Pre-order customers without the ability to pay by mobile device may, in some example embodiments, pay at the order pick up window, similar to sequential order-in-line customers.

Figure 7:
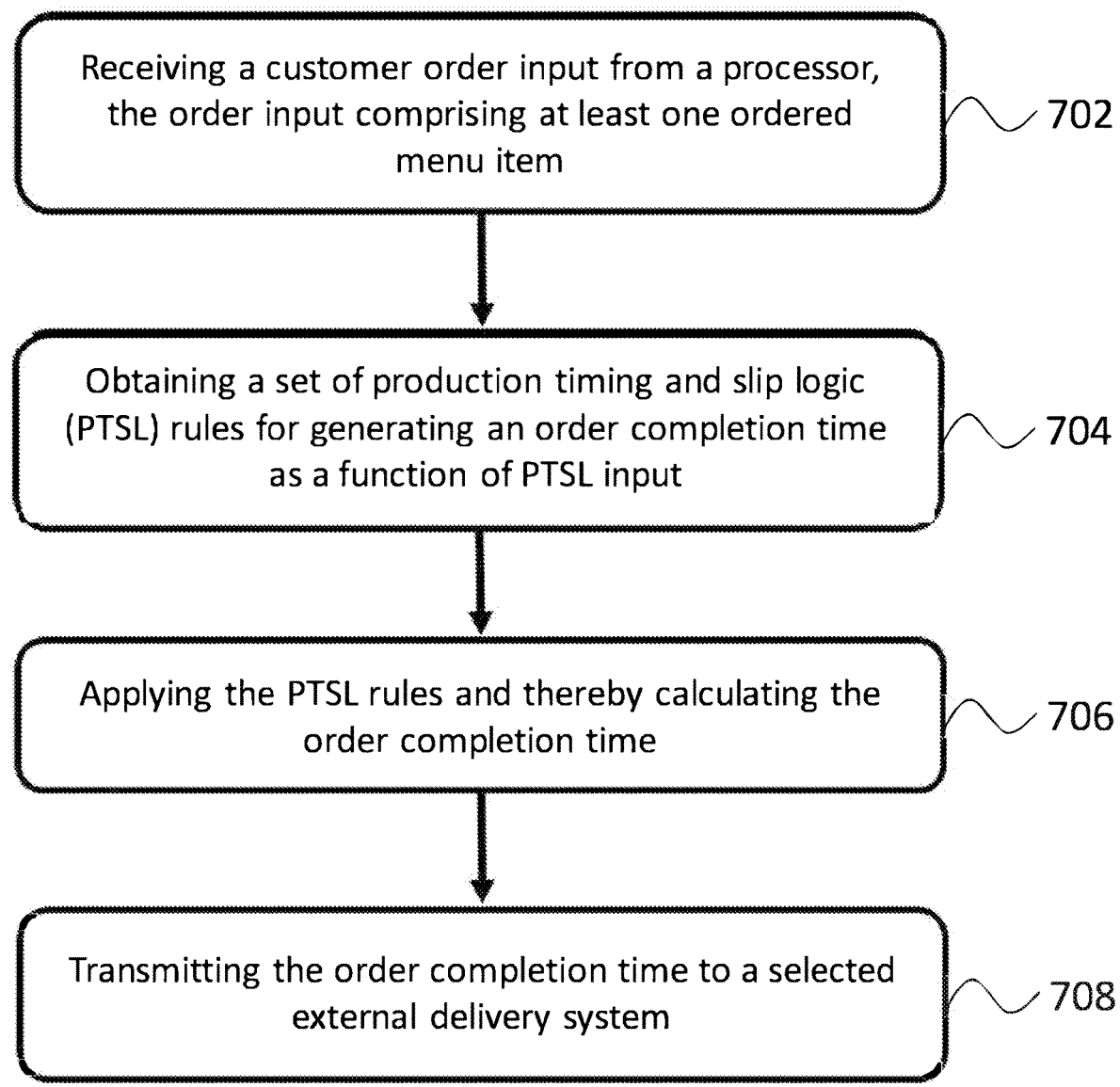
FIG. 7 is a method displaying the process of an embodiment of the present disclosure.

FIG. 7—Order Preparation Method

Referring to FIG. 7, which shows a method 700 for enhanced order preparation via integration with an order delivery service. The method 700 is performed by processing logic that may include hardware (circuitry, dedicated logic, etc.), software (such as is run on a computer system or specialized dedicated machine), or a combination of both. The method 700 or each of their individual functions, routines, subroutines, or operations may be performed by one or more processors of a computing device. In certain implementations, the method 700 may be performed by a single processing thread. Alternatively, the method 700 may be performed by two or more processing threads, each thread implementing one or more individual functions, routines, subroutines, or operations of the methods.

As shown in FIG. 7, method 700 begins at step 702. At step 702, a customer order input is received. The customer order input may include at least one ordered menu item. Additionally, in certain embodiments, the at least one ordered menu item can include one or more of a food item and beverage item. In some embodiments, the customer order can be received from a processor.

In some embodiments, the customer order input received at step 702 may be chosen by the customer using a mobile application on the customer's mobile device (e.g., customer's computing device). In certain exemplary embodiments, while the customer order input comes from a processor on a singular customer device, there are multiple customers that are placing the order. Additionally, in some embodiments, the customer order input received at step 702 may constitute a menu order that is identical to a possible menu order made at a restaurant. For example, the customer order input received at step 702 can include selections of the same drinks, food listings, entrees, appetizers, desserts, and combinations thereof that are provided to sit-down customers or to-go customers at the restaurant.

The customer order input received at step 702, in exemplary embodiments for use when the customer will not dine-in at the restaurant, may further include a requested delivery time and a requested delivery location. The customer order input may, in some embodiments, include the global-positioning information of the customer. For example, in some embodiments, the requested delivery location and the global-positioning information of the customer can function to display the current and planned driving locations to deliver the at least one ordered menu item to the customer.

Moreover, in some embodiments, the customer order input received at step 702 can further include payment information of the customer. In other embodiments, the provisional input may not include specific payment credentials from the customer, but may still include a selection from the customer to pay for the order at the restaurant.

At step 704, a set of production timing and slip logic (PTSL) rules for generating an order completion time as a function of the PTSL input are obtained. In some embodiments, the PTSL input obtained at step 704 includes a plurality of order information. For example, such order information may include one or more of the at least one ordered menu item, an estimated preparation time, a number of employees preparing customer orders, a number of customer orders currently in preparation, a number of menu items currently in preparation, and a summed estimation time corresponding to a sum of estimated preparation times corresponding to the menu items currently in preparation. In related embodiments, the estimated preparation time may correspond to the at least one menu item that is selected by the customer and received at step 702. In certain embodiments, the PTSL input obtained in step 704 may further include at least one of the requested delivery time and the requested delivery location. Moreover, in preferred embodiments, the set of PTSL rules is obtained by the processor.

At step 706, the PTSL rules are applied based upon the customer order input and the PSTL input. In some embodiments, the processor applies the PTSL rules. From the application of the PTSL rules, step 706 continues by calculating the order completion time. This calculation is responsive to receiving the customer order input at step 702. In some embodiments, the calculation is performed by the processor.

At step 708, the method 700 continues through transmitting the order completion time to a selected external delivery system. In some embodiments, the transmission may be performed by the processor. For method 700, the method may additionally include selecting the selected external delivery system from a plurality of external delivery systems. The selection, in certain embodiments, may be based on a determined proximity, at the order completion time, of an available driver to a preparation location of the at least one ordered menu item. Such a selection may be made by the processor.

In some embodiments, the method 700 may additionally include a step of coordinating with the selected external delivery system. In such an embodiment, the processor may perform the coordination. Moreover, in the additional coordinating step, the method may also include thereby identifying, based on the order completion time, a driver to pick up the at least one ordered menu item.

Further, in some embodiments, method 700 may continue through the driver delivery information being received from the selected external delivery system. In some embodiments, the receipt of the driver delivery information may occur at the processor. Further, in certain embodiments, the driver delivery information may include at least one of an identity of the driver, a vehicle of the driver, a license plate number of the vehicle, and some combination thereof. Moreover, in some embodiments, method 700 may continue through the processor receiving, from the external delivery system, an estimated time of arrival of the driver.

Figure 8:
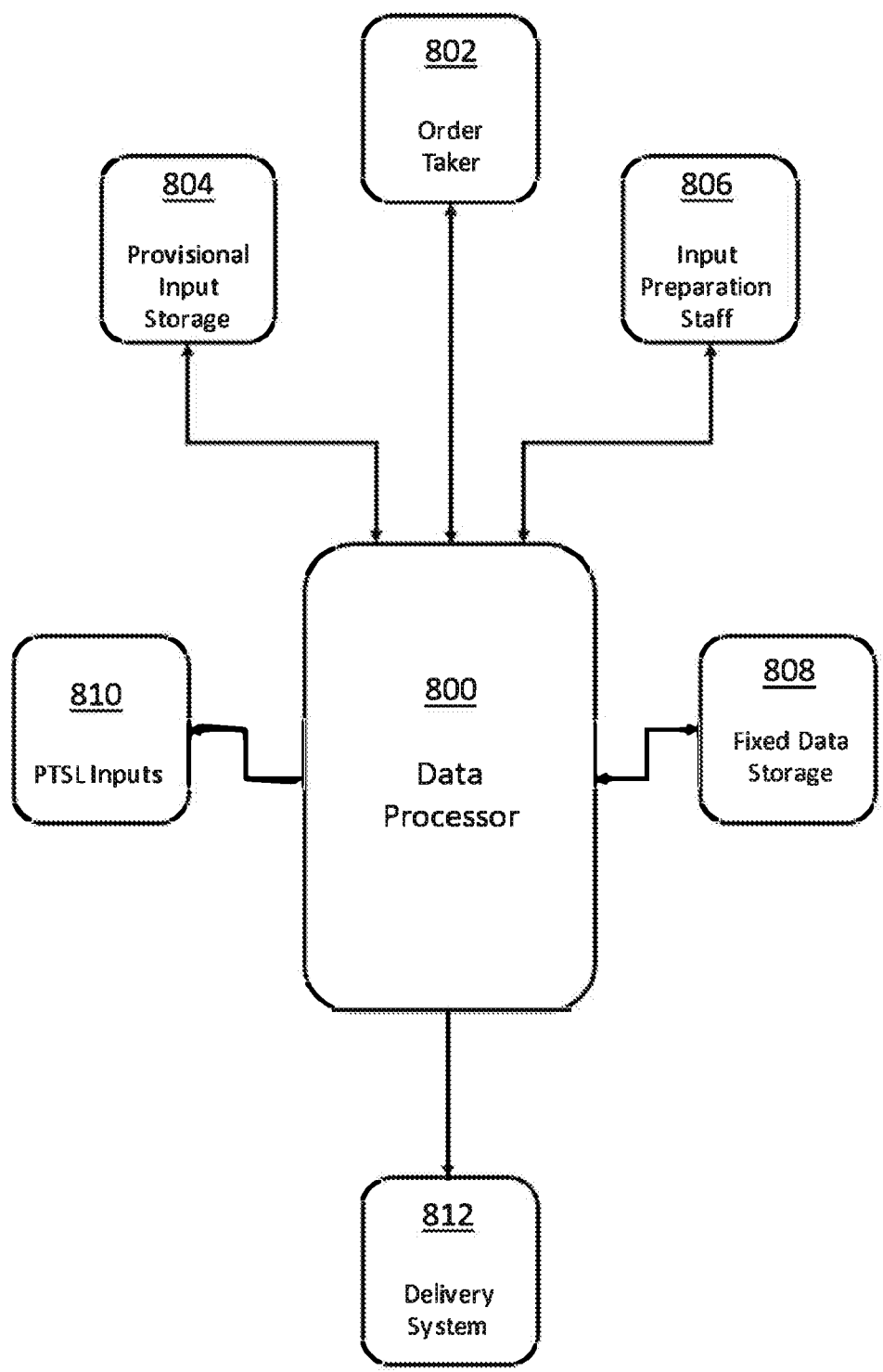
FIG. 8 is a flow diagram of the process and system showing data flow in a data processing unit.

FIG. 8—Restaurant Order System

Referring to FIG. 8, representing various embodiments, there is a flow process diagram of functions of the data processing unit. In FIG. 8, 800 is the computing data processing unit (e.g., data processor) of the system. It will receive or access data from fixed data storage 808 and write to the data storage system. The data, such as menu items, prices, preparation time, and the like, are "fixed" in the sense that they are not immediately variable.

The system will have a mechanism allowing a manager to log in and mark any item, such as "Sold Out," so that customers cannot continue ordering an item no longer in stock. The data may be updated as often as needed and there are means for updating the data. Temporary, calculated, and intermediate calculation values may be retained in the provisional input storage 804; this provisional input storage functions synonymously with the function of data storage unit 132 in FIG. 3.

Immediate changes to customer input—prior to the retention in the provisional storage 804—may come from order taker 802. The change information coming from order taker 802 includes changes to ordered item, edits, delay or requested times for arrival at the restaurant location, delivery location, and the like.

There is also provided means for the Preparation Staff and order administration/management to input data on orders that are being processed. These will include, in some embodiments, individual computer tablets, or equivalent or larger display panels, which will have data on customer ID, ordered item, requested delay time, and calculated preparation order sequence. In some embodiments, the PTSL inputs 810 and the processor of the delivery system 812 work in conjunction with data processor unit 800 for storage of data and rules, such as production timing and slip logic (PTSL) rules, to help optimize the order completion time being determined by the data processor 800 in the system for non-sequential ordering.

The data processor 800 may be communicatively coupled to a memory. In some embodiments, the processor may be configured to execute instruction and thereby perform a method 700 including receiving a customer order input, the order input comprising at least one ordered menu item; obtaining a set of PTSL rules for generating an order completion time as a function of PTSL input comprising one or more of: the at least one ordered menu item, an estimated preparation time corresponding to the at least one menu item, a number of employees preparing customer orders, a number of customer orders currently in preparation, a number of menu items currently in preparation, and a summed estimation time corresponding to a sum of estimated preparation times corresponding to the menu items currently in preparation; applying the PTSL rules and thereby calculating the order completion time; and transmitting the order completion time to a selected external delivery system.

In such an embodiment, where the data processor is configured to execute the method 700, the set of PTSL inputs are the same as PTSL inputs 810. Moreover, the storage of data and PTSL rules from method 700 are determined from the conjunctive work between as PTSL inputs 810, the processor of the delivery system 812, and data processor unit 800.

The data processor 800 will calculate the needed information and send it to the appropriate location. In general, communication for the data processing unit to customer's display and preparation staff will be wireless. The data processing unit and data storage may be a dedicated system or operated by remote shared distributive computing ("the cloud"). A cloud system will generally be preferred.

Figure 9:
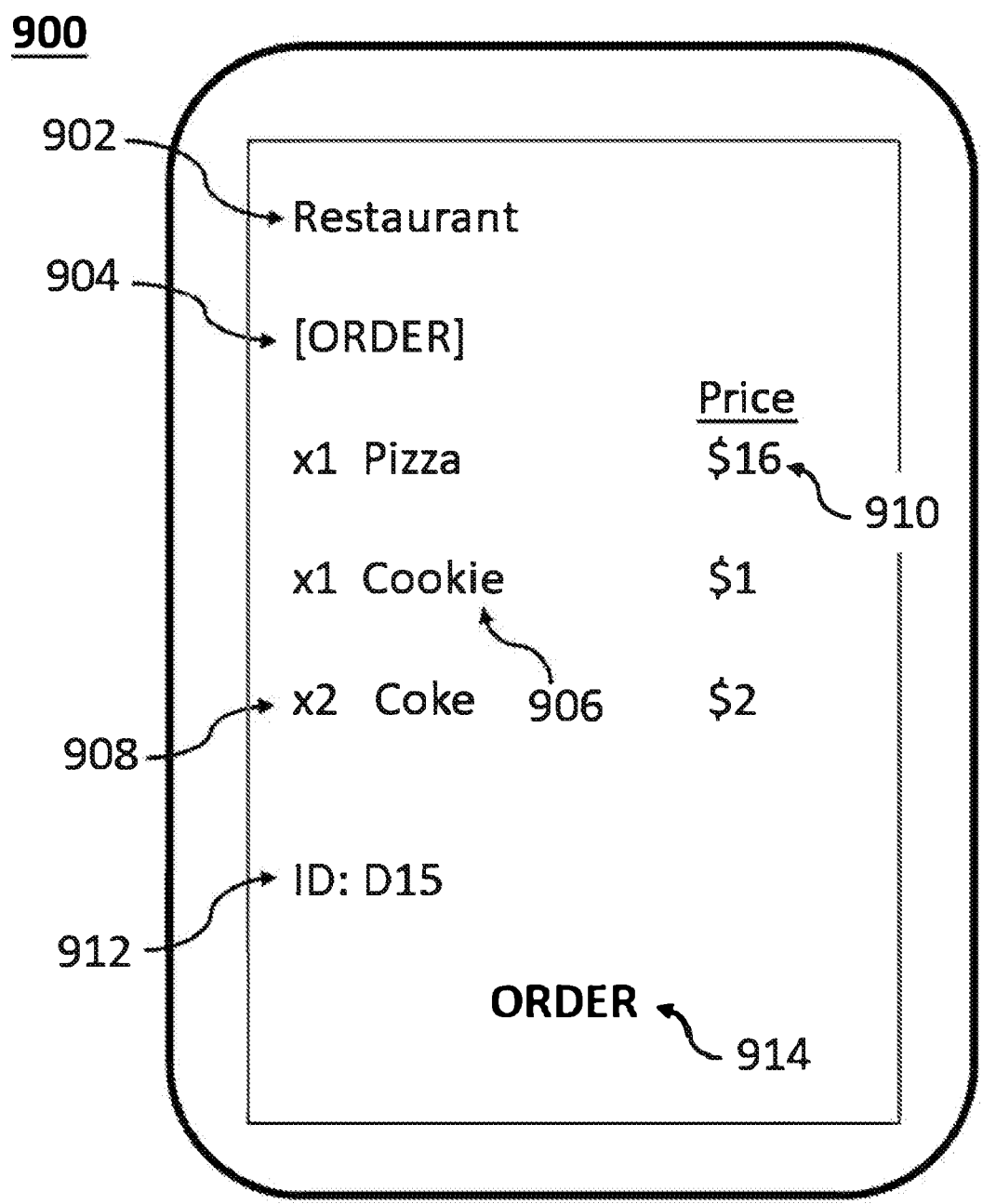
FIG. 9 is a schematic view of a possible mobile device display of an embodiment of the present disclosure before placing an order.

FIG. 9—Order Mobile Display Screen

In various embodiments, as shown in FIG. 9, when the customer accesses a restaurant application interface 900 a customer identification (ID) 912 is generated by a data processing unit, such as data processing unit 800, or the customer uses an existing unique ID number or code. In some embodiments, when the customer selects items from the restaurant application interface 900 for orders, the resulting selection is generated and displayed on the customer's mobile device or computer.

In certain embodiments, the restaurant application interface 900 notifies the customer of the exact restaurant from which the order is being placed. For example, as shown in FIG. 9, the restaurant application interface 900 can include a restaurant identifier 902. Moreover, in some embodiments, restaurant application interface 900 on the customer device may signify the current part of the ordering process. For example, as shown in FIG. 9, the restaurant application interface 900 may display that the customer is at the "ORDER" or "ORDER PLACEMENT" stage of the ordering process by displaying a process indicator 904.

In exemplary embodiments, such as the embodiment shown in FIG. 9, the restaurant application interface 900 may generate and display the menu item name 906 of the selected menu items, the quantity 908 of each of the selected menu items, and the price 910 for each of the selected menu items, as illustrated in FIG. 9. Thus, the customer can see (104 display on customer's mobile device, see also FIG. 9 or appropriate computer screen) which menu items to expect when arriving at the restaurant and can edit the order accordingly. The system data processor(s) will calculate all the variables.

After selecting to "ORDER" based on an ordering button 914 located on the restaurant application interface 900, the customer order input may be sent to the restaurant. As the customer proceeds to the store, in some embodiments, in certain embodiments, the screen may display the status of each item that has been ordered by the customer.

Utilizing the systems displayed, kitchen orders may be prepared by the preparation staff in parallel, not necessarily in linear sequence, as determined and arranged by an algorithm of the data processing unit. The system algorithm determines which order to make next based upon the information included in the customer order input. Simple orders and preferred guests' orders are moved forward in progression. Multiple orders may be worked simultaneously.

The data processing unit or module for this system, as shown through the data processor 800 and related system, is the computing and data generation heart of the system. It contains suitable data storage capacity for menu items, prices, preparation time, customer identification, order details, payment details and the like. It is capable of computing preparation wait time and pre-preparation times from inputted and stored data and causing the resulting information to be displayed on customers' devices and display panels, for customers and preparation personnel.

The data processing unit and associated data storage will suitably be a computer programed and running software to perform the functions described. Implementation of such a data processing system is well within the capabilities of those skilled in the art.

Figure 10:
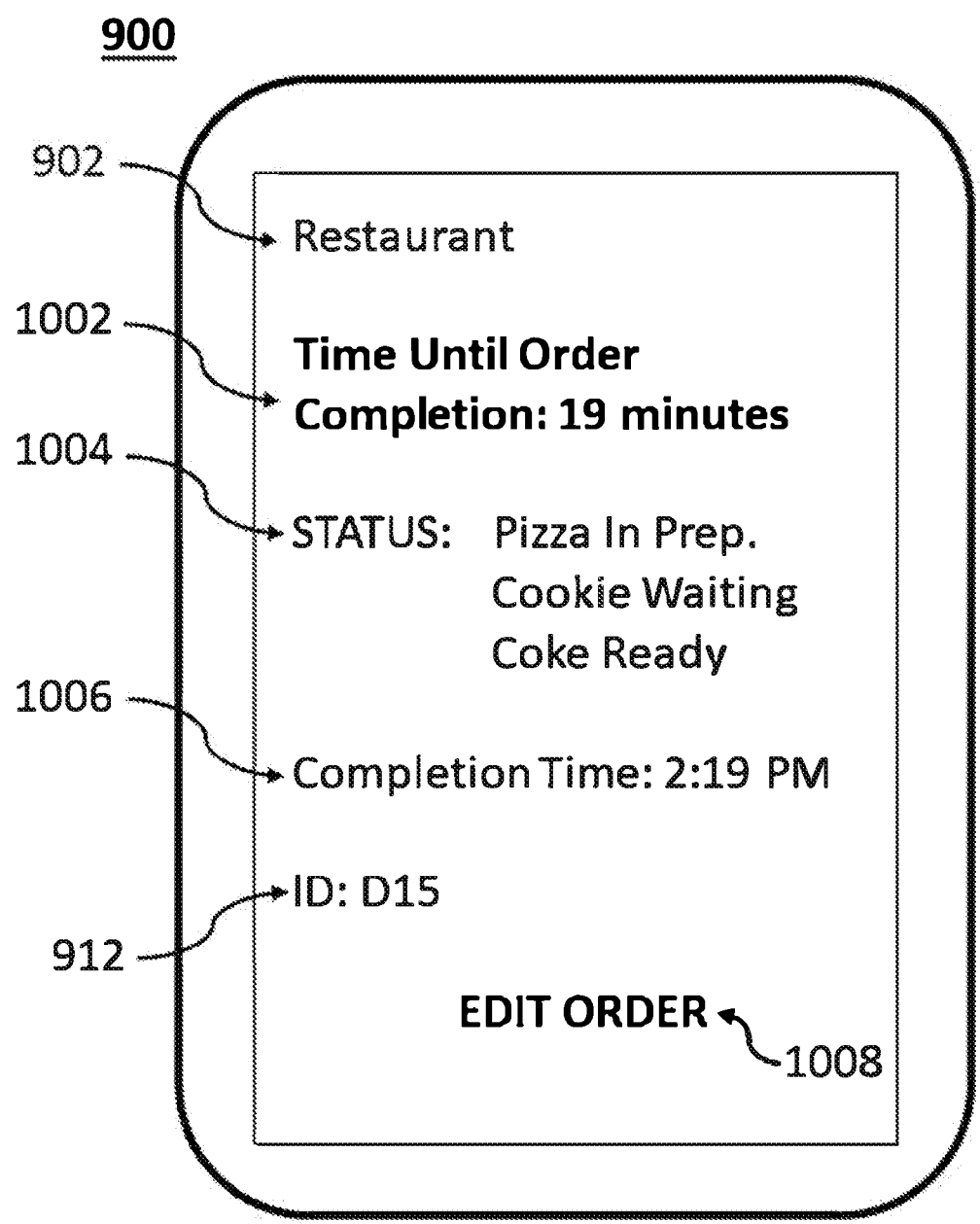
FIG. 10 is a schematic view of a possible mobile device display of an embodiment of the present disclosure after placing an order.

FIG. 10—Order-Status Mobile Display Screen

In various embodiments, shown in FIG. 10, after selecting to "ORDER" from the restaurant application interface 900, the customer order input may be sent to the restaurant. In some embodiments, as shown in FIG. 10, the customer may edit the order by selecting an editing button 1008, which states "EDIT ORDER" on the restaurant application interface 900. For example, the customer after selecting the editing button 1008 may delete pizza, and select another item with a shorter preparation time (see 106 to 102 of FIG. 1, which may be used in conjunction with the screen of FIG. 10).

As illustrated on FIG. 10, once the order is set and at least a first customer order input has been sent to the restaurant, the time until order completion 1002 may be shown on the restaurant application interface 900. Accompanying the time until order completion 1002, in certain embodiments including the exemplary embodiment of FIG. 10, the completion time 1006 may also be presented. In such an embodiment, the completion time 1006 can present the time based on the local time zone that the order will ready to be picked up from a restaurant or a delivered to an input delivery location.

As the customer proceeds to the store, in certain embodiments, the screen may display the status 1004 of each item that has been ordered by the customer. In some embodiments, the customer may ensure that the status 1004 corresponds to the customer's particular order based upon the included customer identification (ID) 912 and the included restaurant identifier 902 located on the restaurant application interface 900.

Utilizing the systems displayed, kitchen orders may be prepared by the preparation staff in parallel, not necessarily in linear sequence, as determined and arranged by an algorithm of the data processing unit. The system algorithm determines which order to make next based upon the information included in the customer order input. Simple orders and preferred guests' orders are moved forward in progression. Multiple orders may be worked simultaneously.

The data processing unit or module for this system, as shown through the data processor 800 and related system, is the computing and data generation heart of the system. It contains suitable data storage capacity for menu items, prices, preparation time, customer identification, order details, payment details and the like. It is capable of computing preparation wait time and pre-preparation times from inputted and stored data and causing the resulting information to be displayed on customers' devices and display panels, for customers and preparation personnel.

The data processing unit and associated data storage will suitably be a computer programed and running software to perform the functions described. Implementation of such a data processing system is well within the capabilities of those skilled in the art.

Figure 11:
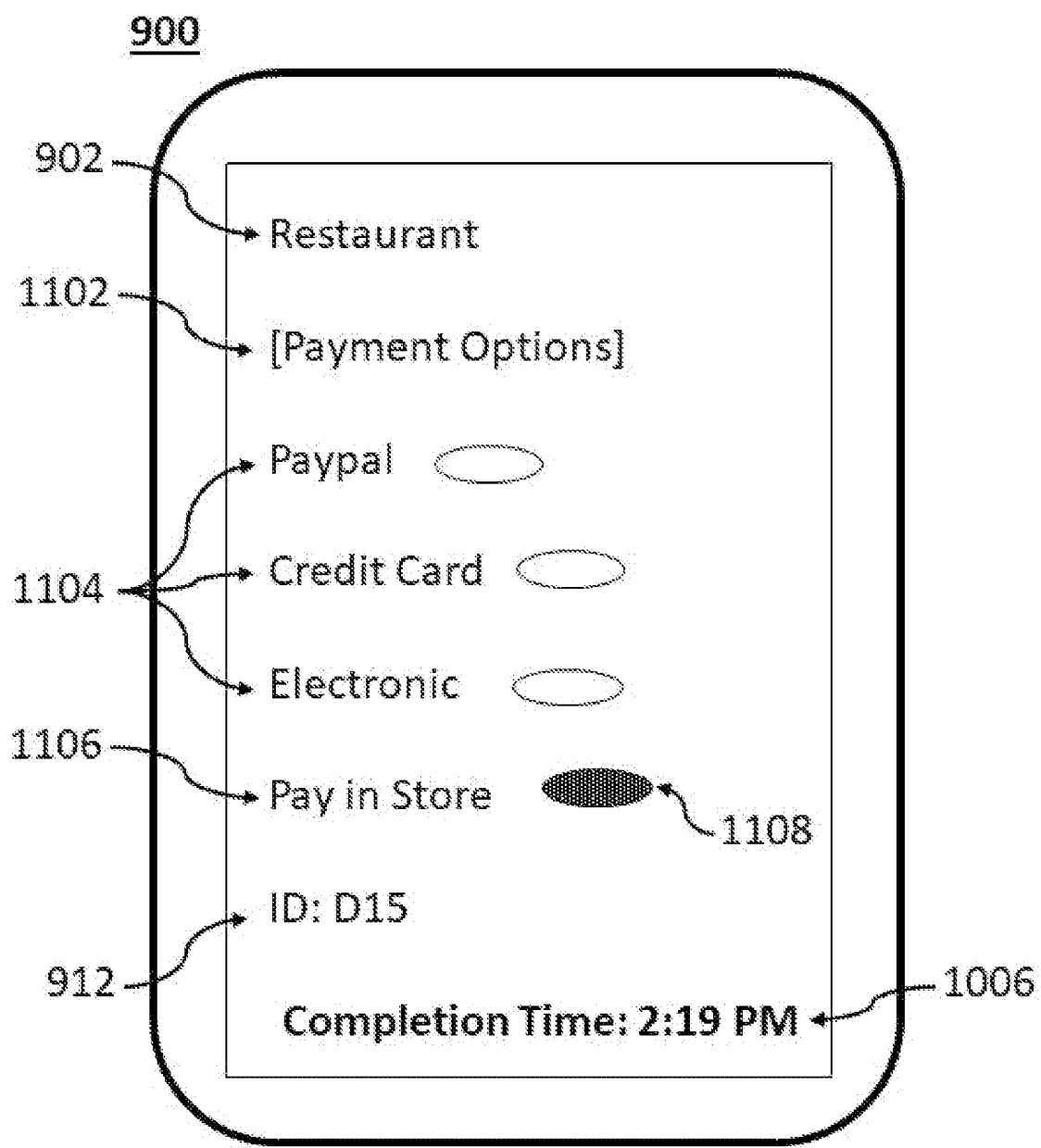
FIG. 11 is a schematic view of a possible mobile device display of an embodiment of the present disclosure showing payment options.

FIG. 11—Payment Mobile Display Screen

In various embodiments, shown in FIG. 11, if and when a customer selects a payment option, the customer may be taken to a payment options screen 1102, where the customer is asked to choose a payment style. In such an embodiment, the customer may be able to select options for payment using their device, through electronic payment methods 1104, or may select to pay at the store 1106. When a customer selects an option for payment on the restaurant application interface 900, the selection may be displayed through a marked payment selection 1108.

In preferred embodiments, only electronic payment methods 1104 from a customer's mobile or computer device connected by the internet (or other distributive computing method or connectivity method) is accepted as payment. There are many mobile payment systems available and the mobile payment systems may use a digital wallet that stores credit card information, cryptocurrency information, bank account information, and the like in a secure manner. These include Square Wallet, virtual prepaid cards, Google Pay, Apple Wallet, Android Pay, Dwolla, and the like. In some embodiments, there is provided a kiosk at the restaurant location for payment by credit card, cash, other payment means, or combinations thereof. Also, in some embodiments, there is provided a customer service representative (order taker) in the location parking lot that will have a mobile device for taking orders and payments.

In some embodiments, the customer may ensure that the marked payment selection 1108 corresponds to the customer's particular order based upon the included customer identification (ID) 912 and the included restaurant identifier 902 located on the restaurant application interface 900.

Utilizing the systems displayed, kitchen orders may be prepared by the preparation staff in parallel, not necessarily in linear sequence, as determined and arranged by an algorithm of the data processing unit. The system algorithm determines which order to make next based upon the customer order input, including the payment method. Simple orders, preferred guests' orders, and, in some embodiments, orders paid using electronic payment methods 1104 are moved forward in progression. Multiple orders may be worked simultaneously.

The data processing unit or module for this system, as shown through the data processor 800 and related system, is the computing and data generation heart of the system. It contains suitable data storage capacity for menu items, prices, preparation time, customer identification, order details, payment details and the like. It is capable of computing preparation wait time and pre-preparation times from inputted and stored data and causing the resulting information to be displayed on customers' devices and display panels, for customers and preparation personnel.

The data processing unit and associated data storage will suitably be a computer programed and running software to perform the functions described. Implementation of such a data processing system is well within the capabilities of those skilled in the art.

Figure 12A:
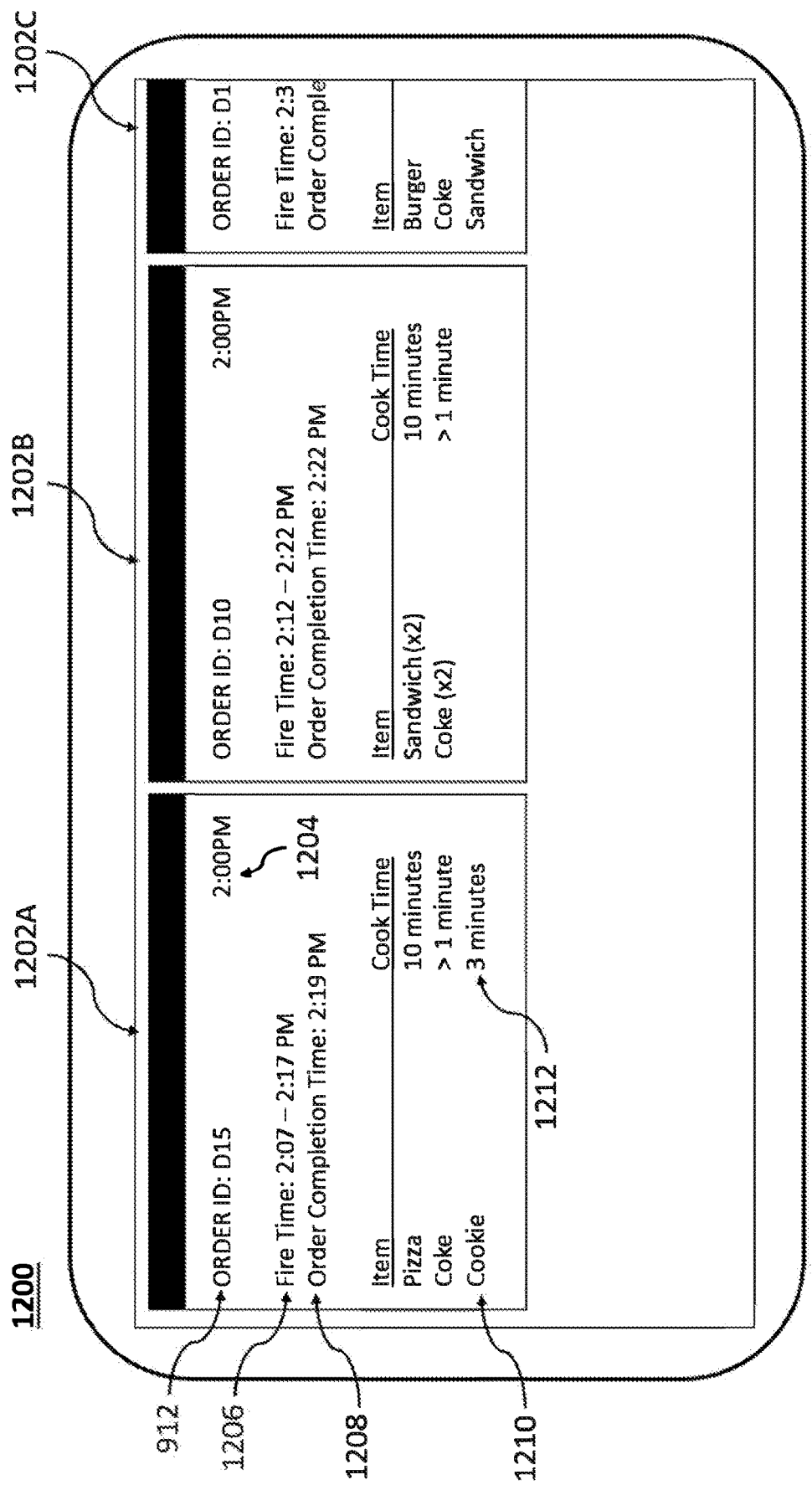
FIG. 12A is a schematic view of a possible visual display in the restaurant of an embodiment of the present disclosure after an order has been placed on a customer device.
Figure 12B:
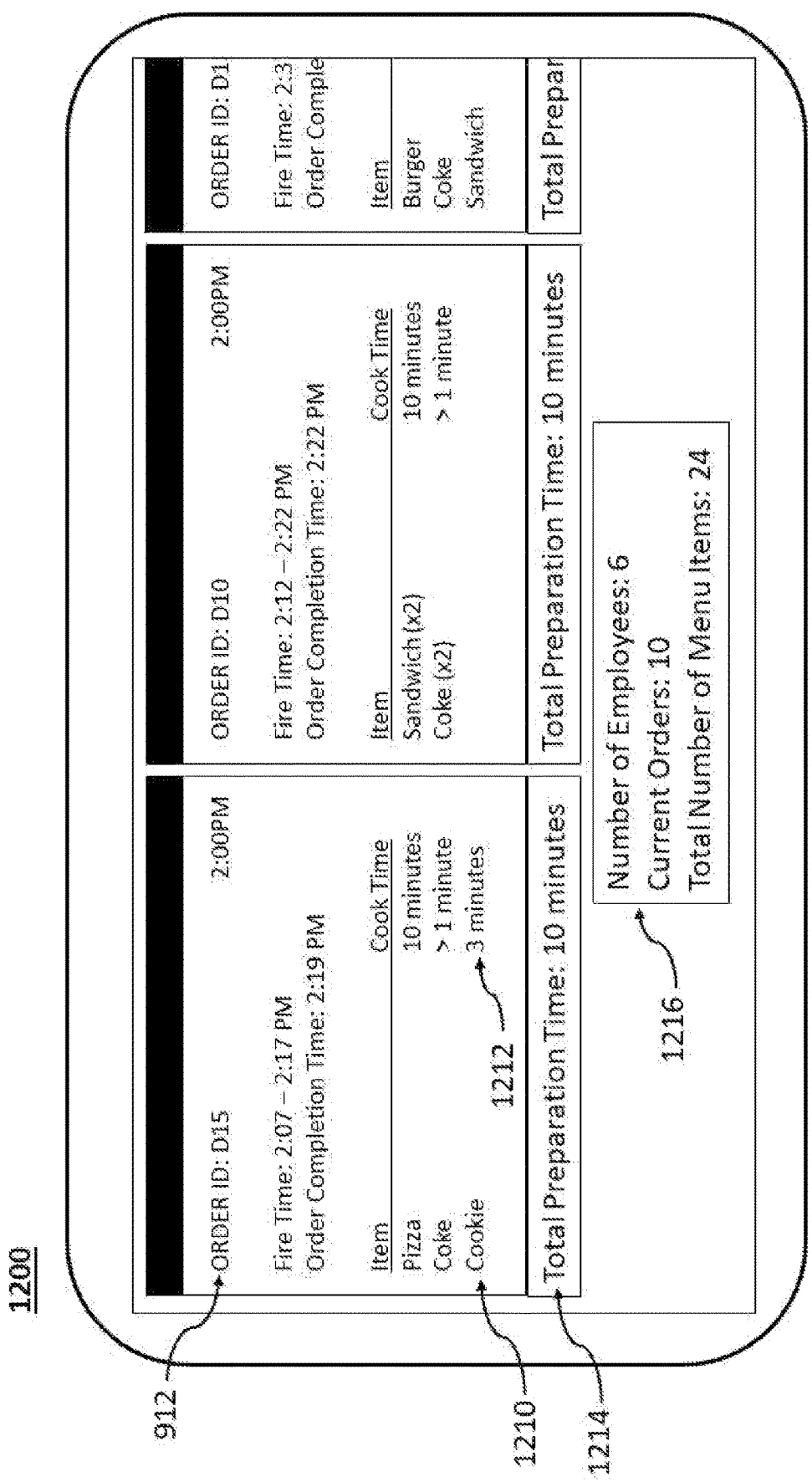
FIG. 12B is a schematic view of a possible visual display in the restaurant of an embodiment of the present disclosure displaying PTSL input information associated with an order that has been placed on a customer device.

FIG. 12A-12B—Restaurant Order Visual Display Screens

In various embodiments, shown in FIGS. 12A-12B, the restaurant can utilize a visual display 1200 that presents the information collected and determined by a system for non-sequential restaurant orders. In some embodiments, the visual display 1200 may present the order in which to prepare received orders coming from customer order inputs.

As shown in FIG. 12A, at the restaurant location, the visual display 1200 can present display information to the restaurant employees—including cooks, employees, and wait staff—that allows for non-sequential order preparation. In some embodiments, the visual display 1200 may list the orders that are currently received from customers in a non-sequential order, as shown through 1202A, 1202B, and 1202C. For example, the order associated with 1202B may be placed prior than the order associated with 1202A. In such a non-sequential order, nonetheless, the visual display 1200 may list order 1202A before 1202B because of optimized ordering system, corresponding to the system utilized with data processor 800 and method 700, as shown in FIGS. 8 and 7, respectively. The customers may include customers physically present within the restaurant location or those utilizing a method and system that operate off restaurant applications, such as the displays shown in FIGS. 9-11.

The visual display 1200, in certain embodiments, can include information such as the fire time of the order 1206, the order completion time 1208, the current time 1204, the items that have been ordered 1210, and the preparation time associated with each ordered item 1212, as shown in FIG. 12A. Additionally, as displayed as an exemplary embodiment in FIG. 12A, the orders may be listed in a non-sequential queue that may adapt based on received customer input orders and PTSL inputs.

Moreover, in various embodiments, as shown in FIG. 12B, the visual display 1200 may include information corresponding to the PTSL inputs being used by the non-sequential restaurant order system and method. For example, in such embodiments, the visual display 1200 may include at least one ordered menu item 1210, an estimated preparation time corresponding to the at least one menu item 1212. Further, in some embodiments, the visual display may include a current workload display 1216 highlighting PTSL inputs corresponding to the current workload of the kitchen, such as a number of employees preparing customer orders, a number of customer orders currently in preparation, a number of menu items currently in preparation, and a summed estimation time corresponding to a sum of estimated preparation times corresponding to the menu items currently in preparation.

The visual display 1200 in the restaurant location, including those shown in FIGS. 12A-12B, can be communicatively coupled with the systems that are processing the customer orders from the customer device. The data processing unit and associated data storage will suitably be a computer programmed and running software to perform the functions described.

Further Components and Variations

Presence Detection and Approaching Customer Identification

In various example embodiments, the restaurant location is provided with presence detection means (as discussed elsewhere herein), vehicle identification means (as discussed elsewhere herein), or both. In some such example embodiments, the vehicle is identified as it approaches the order pick up window, and the identification is provided to wait staff. In some such embodiments, the wait staff select the order for the customer approaching the window, place the prepared orders in the order that customers are approaching the window in the order pick up lane, or both.

In some example embodiments, a customer's license plate is associated with their order. The license plate identification sequence ('number'), in various example embodiment and in various situations, may be entered automatically by a license plate reader apparatus, may be entered by the customer placing the order, may be entered by a staff member taking the order, or other suitable means. In various example embodiments, another identification means may be used alternatively or in combination, including an image of the vehicle, an order number, a color and make of the vehicle, a one-dimensional or multi-dimensional scan code (such as a barcode, QR code, etc.), a store-provided order device (such as a device with a unique number that alerts the customer when an order is ready, and can also be identified by the restaurant location to direct customers when to merge), a mobile device (mediated, in some embodiments, by an application), etc.

In various example embodiments, the order processing system may automatically notify customers to merge when the order is marked ready, at a specific time (e.g. a predetermined amount of time before the calculated order ready time) or event (e.g. a trigger time, status change of order directly in queue before the customer's order to 'ready', etc.), another suitable trigger, or combinations thereof.

Lane Merging

In some example embodiments, the restaurant location may offer both a drive-through order lane(s) and a non-sequential order pick up window(s). Such example embodiments may be advantageous for restaurant locations with existing traditional drive-through order lanes, or with a significant customer base that wishes to preserve a traditional drive-through ordering experience. In some such example embodiments, an ordering lane is provided with a linear, sequential-access drive-through lane, where customers enter the lane, approach the ordering window, and place their order. At this point, customers do not wait to receive their order—thereby holding up other customers waiting to place their order.

In some example embodiments, they directly merge into a non-sequential access drive-through lane as their order is ready. In some example embodiments, they enter a waiting area, in common with people who have placed mobile or online orders, and enter a non-sequential drive-through lane as their order is ready (e.g. when they are notified by an order-ready board, by a text message, notification device handed to them at the order placement window and returned to the restaurant at the pick-up window, etc.). In some such example embodiments, the customer is directed to circle the restaurant building and enter a waiting area, such as non-sequential waiting spaces, non-sequential queue lanes, parking spaces, etc.

The restaurant location can, thus, offer drive-through ordering and payment, while still preserving the convenience and time advantages to customers who have pre-ordered. Customers who wish to order at the location (order-in-line customers) can do so, while customers who wish to pre-order can pick up their order as it is ready, without being trapped in line behind order-in-line (non pre-order) customers.

Some example embodiments merging a sequential drive-through order line with a non-sequential order pick up line are provided with merging control means to control the flow of traffic from multiple lanes into one (or at least into fewer) non-sequential order pick up lane. In some such example embodiments, the merging control means comprises one or more presence detectors, such as a magnetic loop embedded in the road, ultrasonic sensor, video sensor, radar sensor, or other suitable apparatus.

The merging control means, in some example embodiments, further comprises signaling means to direct traffic from various lanes when to enter the non-sequential pick up lane. In some such example embodiments, the signaling means comprises a light signaling system for merging, such as having a red and green (or other suitable colors) for each lane. When a customer is to enter the non-sequential pick up lane, the light for their lane turns green. In some such example embodiments, direct access (as opposed to access from the ordering/payment lane(s)) to the pick-up lane (such as from the parking lot, from queuing spaces and/or lanes, etc.) is 'green' (for go/enter) by default, while access from the ordering lane is 'red' (for stop/do not enter) by default. When the next order in line in the ordering/payment lane is ready, the direct access lane signal switches to 'red' (or other 'stop' signal), and the access from the ordering lane switches to 'green' (or other 'go' signal). In various example embodiments, other appropriate signaling is used, such as words, rotating signs, audible signals, text messaging, etc.

Example embodiment with an ordering lane merging directly into a pick up lane preserve the advantages of non-sequential access to order pick up based on order ready time, thereby preserving efficiency for pre-orders, and preserving order pick up time accuracy (e.g. not unnecessarily extending order pick up time by forcing customers to wait on orders being placed, prepared, and delivered in sequence)—customers are enabled to "jump the line" at the restaurant by pre-ordering. Such example embodiments may be useful for locations that are presently relatively traditional, sequential access ordering/payment pick up locations, allowing them to add a "jump the line" feature for non-sequential order pick up to incentivize customers who prefer the advantages of pre-ordering instead of waiting in line.

In some example embodiments, such as some referenced above, a further advantage is added by extending the benefit of non-sequential order pick up to drive-through ordering customers. Such example embodiments include those in which traditional drive-through order/payment pick up locations are converted into non-sequential pick up locations by providing a non-window ordering and payment station. Such example embodiments may be useful for locations that do not have the capability for two or more windows, or merging lanes together. Locations with only one window will, in some example embodiments, convert their window into a non-sequential pick up only window.

Various such example embodiments are provided with at least one of: an ordering station with a microphone, separate from the flow of the non-sequential pick up window; an ordering kiosk without a microphone; an ordering kiosk with a touchscreen with or without a microphone; one or more attendants with mobile ordering and payment stations (such as a tablet) in the parking lot; or other suitable means for taking orders. Such order and payment taking means, may be placed outside of the flow of the non-sequential order pick up window lane(s), thereby preserving customer access to the order pick up window when their order is ready. Such order taking means may accept payment as well. Some are capable of accepting cash, checks, or both, while others only accept electronic forms of payment (such as at least one of debit and credit cards, Apple Pay™, Paypal™, Google Pay™, Venmo™, Bitcoin™, etc.).

In some example embodiments extending the benefit of non-sequential order pick up to drive-through ordering customers, at least one ordering lane is provided. The ordering lane provides access to a plurality of queuing parking spaces, enabling a customer to place an order and pay for it, and then move to a queuing space and wait to enter the non-sequential order pick up window just like pre-order customers. Such example embodiments can, in a measure, provide the "best of both worlds" for pre-order and drive-through-ordering customers, allowing both to order in their preferred way, while also allowing both pre-order and drive-through-ordering customers to pick up their order in a non-sequential manner according to the order-ready time.

Multiple Order Channels

In some example embodiments, the restaurant merges orders from multiple order-receiving channels, and distributes the orders after preparation back out to the proper channel. Channels include, in various example embodiments, at least one of: custom mobile phone application, custom website, third-party app, third-party website, or food services (such as GrubHub™, Favor™, Fourpoor™, Dash™, etc.). In some such example embodiments, the restaurant provides a separate pick up area, a separate order pick up window, or both, for delivery services. In such example embodiments, a third-party delivery driver comes to a designated pick up area window, while a direct customer comes to a different pick up area window. In some example embodiments merging orders from multiple order-receiving channels, the order-receiving channels are reduced by restricting all orders from the order pick up window, and re-directing them to another channel (such as mobile ordering).

Multiple Locations

In some example embodiments, a common ordering system is provided across multiple restaurant locations. In some such example embodiments, calls for multiple locations are routed to a common call center (or regional call centers). Such example embodiments allow a single call center for multiple stores, which provides advantages to customers and restaurant staff. Restaurant staff may be calmer—wait staff are not having to handle juggling phone calls, or at least not the same frequency of phone calls, and wait staff do not have the problems with hearing customers due to the background noise of a busy restaurant. Customers may receive calmer, more focused service, less background noise, and more accuracy in their orders. The ability to call is useful, for example, for people who want to pre-order but are not comfortable with mobile or online ordering, for larger orders that are inconvenient or unable to purchase over the online or mobile ordering system, and for questions regarding policies, menu, service, billing issues, etc.

Order Selection Accuracy

In some example embodiments, the system and methods may be optimized for accurate order delivery (including handoff at an order pick up window) to the customer. When the orders are prepared and waiting for pick up, it may be a risk that the wrong order is handed off to the wrong customer. This is particularly challenging when there is more than one order pick up window. It is also particularly challenging when there are multiple customers with the same name, if the name is used to identify the order.

In some example embodiments, order accuracy may be increased—as well as operational efficiency—by enabling a single order pick up window to be used, because the customers in the drive through at any given time are greatly reduced by non-sequential access as the orders become ready (as discussed elsewhere herein). In some example embodiments, the order system displays order information on screens (such as a tablet, a computer screen, an order display in the production area, etc.). In some example embodiments, the order system prints off a sheet for each order, or a sheet with multiple orders, with the relevant details of the order for wait staff to use in production and delivery.

In some example embodiments, as discussed elsewhere herein, the staff are notified as a customer is approaching the order pick up window, and given identifying information on the customer (such a license plate, order ID by identifying a mobile device in the customer's vehicle, etc.), giving staff time to locate and double-check the order before the customer appears at the pick-up window. In some example embodiments, the order system highlights "doubled names" to alert staff that there are multiple orders with the same or similar identifying information. Various example embodiments highlight doubled identifying information—customer-input order ID, vehicle physical characteristics, customer name, etc. In some example embodiments, a unique ID is provided to each order that prevents doubling.

Customer Locating

The order system is also capable, in some example embodiments, of acquiring the location of a customer by receiving information from a global positioning system (GPS) system in the customer's mobile device or computer. GPS coordinates of the ordering customer is received from their mobile device and sent to the ordering system, or locating service or system connected to the ordering system, to aid in calculating travel time to better estimate a "future" pick up time. This is especially helpful for a restaurant along a highway. Potential customers can search down their travel route for a suitable restaurant, order using their mobile device, and have the system tell them how much time is required to reach the destination pick up location. Operation of a similar GPS system for ordering is disclosed in U.S. published patent application 2006/0293971, the disclosure of which is incorporated herein by reference. U.S. Pat. No. 8,059,029 discloses a GPS tracking system with helpful information on the way and means to set up an appropriate GPS ordering system. The disclosure of U.S. Pat. No. 8,059,029 is incorporated herein by reference.

In another example embodiment the same GPS tracking is used to enable drone delivery or any other delivery method to static locations or moving vehicles while in transit. For the example above, the customer may wish to order, but not stop; preferring to have a drone meet the moving vehicle with the food order.

Mapping

In some example embodiments, the ordering system is provided with, or connected to, mapping software. In some such example embodiments, the ordering system is provided with internal maps with delivery-time zones, used to calculate delivery time to the customer's location. In some example embodiments for multi-location restaurants, the ordering system is further provided with store-delivery-range zones. The customer's location is determined, and the order is routed to the appropriate location to make and deliver, based on store-delivery-range zones. In some such example embodiments, some locations provide delivery service, and some do not; in such example embodiments the ordering system routes delivery orders only to locations providing delivery service. The ordering system takes delivery time into account in queuing the order and providing an estimated order delivery time, as discussed elsewhere. It may be an advantage to accurately estimate delivery time for the customer and for production timing and slip-logic, as for many restaurants and locales, delivery time is greater, and often much greater, than production time. Accordingly, providing accurate timing to the customer, and efficient production, may rely on reasonably accurate delivery timing and estimation.

In some example embodiments, the restaurant is listed with at least one mapping service or app (such as Google Maps™, Apple Maps™, Bing Maps™ OpenStreetMaps™, MapQuest™, Yahoo! Maps™, Wikimapia™, etc.), travel service or app (such as Tripit™, Airbnb™, Roadtrippers™, TripAdvisor™, etc.), or other such service or app. A customer is preparing a trip, or is on the road, and searches restaurants near a given location. When the restaurant appears on the search, and is selected by the customer, the ordering system (an app, website, or other suitable means) receives a customer's location from the app or service (such as through attributes of the URL passing location (such as a "GET" method), variables passed through an application programming interface (such as a "POST" method), permission to access the current location of the customer from the device directly, etc.).

The order system highlights menu options that will be ready by the time the customer arrives, restricts items that will not be ready, or some combination thereof. The customer places the order as discussed elsewhere herein, and the restaurant prepares the order likewise. The customer can, in such example embodiments, have a meal ready for them—potentially higher quality than fast food in terms of taste, options, health, etc.—with minimal delay in their trip.

In various example embodiments, the order system estimates the time from the customer's current location to the restaurant location by at least one of: receiving an estimated travel time from the mapping service or app, receiving a distance from the mapping service or app and calculating an estimated travel time therefrom, receiving a current customer location from the mapping service or app and using a third-party mapping service to estimate travel time, receiving a current customer location from the mapping service or app and using an internal mapping algorithm to estimate travel time, other appropriate means, or some combination thereof.

In some example embodiments, at least part of the ordering system is provided by a third party, and individual restaurants or restaurant chains have the option of subscribing to or otherwise participating in this multi-vendor ordering system. In some such example embodiments, the multi-vendor ordering system integrates with one or more mapping services or apps—which in various embodiments are third-party or are directly incorporated into the software.

In such example embodiments, customers can search a map for restaurants near a given location, or along a given route. The customer can filter for restaurants participating in the multi-vendor ordering system (or the search is restricted only to participating restaurants), and then can place an order seamlessly. The multi-vendor ordering system presents ordering information to the customer, and sends the order to the restaurant. In some example embodiments, the multi-vendor ordering system at least handles all interaction of the customer with the ordering system, such that the customer never has to leave the unified interface, and may order from one or more restaurants directly from the interface.

In some example embodiments, the multi-vendor ordering system allows restaurants to customize the look and feel of the menu on their ordering system, within general system or app parameters.

Various example embodiments using mapping and order systems allows the customer to order through virtual assistants, such as Cortana™, Siri™, Alexa™ Google™, etc., using voice commands. It is said that the most common restaurant internet (including mobile) search is "restaurants near me." It may well become "restaurants on my route." One or more example embodiments may provide added convenience and increased choice to customers. One or more example embodiments may provide efficiency and increased customer engagement and potential customer base for restaurants.

Delivery

In some example embodiments, the restaurant provides external order delivery service, actually delivering the order to a customer-specified location. In some example embodiments, the restaurant provides external order delivery through at least one third-party delivery service (such as GrubHub™, Favor™, Fourpoor™, Dash™, etc.) In some example embodiments, the restaurant provides external order delivery at least through restaurant-specific delivery personnel, whether employees or contractors. In some example embodiments, the external order delivery personnel pick up orders to deliver to customers at the order pick up window. Such example embodiments provide easy integration of delivery drivers; the non-sequential access prevents delivery personnel from unduly interfering with the flow of customers.

In some example embodiments, the personnel pick up orders to deliver to customers at a separate location, such as a dedicated delivery-personnel order pick up window. Such example embodiments are especially useful for locations with relatively high volumes and/or relatively high percentages of external delivery orders, separating the delivery personnel from the flow of normal customer pick up traffic, and preventing delivery personnel traffic from slowing down the flow of customer pick-ups, particularly when the drivers are picking up multiple orders to deliver. Such example embodiments having a dedicated delivery personnel order pick up window may preserve the efficiency of non-sequential access for drivers, especially by eliminating the need for drivers to find a parking space and enter the restaurant.

In some example embodiments, a customer is provided with the option to convert their pick up order to an external delivery order. For example, a customer may have placed a pick up order, received an order-ready time (for example, of 15 minutes), and planned to leave the office in 10 minutes, drive for 5 minutes, and pick up the order when ready. If the customer then becomes engaged in a meeting, phone call, car refused to start, etc., the customer can access the order again (e.g. on a mobile device, computer with online access, telephone, etc.) and request that the order be converted to a delivery order. The order is assigned to a delivery driver, and the order-delivery time is then calculated. No interruption of restaurant workflow is caused, and the customer can still conveniently receive their order.

Such an example embodiment works particularly smoothly in a location with an order pick up window for customers and delivery drivers, where the order is simply picked up by a delivery driver instead of the customer. The order system is updated to indicate pick up by the delivery driver, and the restaurant wait staff can verify the order pick up person accordingly. In example embodiments having a separate delivery driver window, the order can be transferred to the delivery driver pick up area in the restaurant, or a shared area having access to the customer order pick up window(s) and the delivery driver order pick up window(s).

In some example embodiments, the order system allows the customer to designate another person, such as a family member or third-party delivery driver, to pick up the order. The customer can, in various such example embodiments, designate another person by email, phone number, name, etc. In some cases, in some example embodiments, the ordering system allows the customer to send the order, or certain data regarding the order, directly to the designated person. The order system updates the information associated with the order, and wait staff at the restaurant location can validate the person picking up the order against the information in the order system.

Location-Triggered Order Preparation

In some example embodiments, the ordering system is optimized for fresh-cooked food, which may be advantageous for restaurant locations that specialize in food being just prepared as the customer receives it. In some such example embodiments, the ordering system is provided with internal or external maps, and the capability of estimating travel time to the restaurant location(s), either internally, or through connection with an external module or system. Customers with mobile devices having location abilities (such as equipped to communicate with global positioning system (GPS), GLONASS, etc.). The mobile device (potentially embedded in a vehicle) runs a software (such as mobile app) that conveys the customer's location to the order system. The order system monitors the customer's location, calculates the time required to arrive, and triggers order preparation to start once the calculated time from the customer's current location is approximately the same as the order preparation time.

In various example embodiments, positive or negative buffers are added to increase the likelihood of the order being ready when the customer arrives (positive buffer—time is added), or to make sure that the order is being completed as the customer arrives (negative buffer—time is subtracted)—such as for a restaurant that completes and serves an order in the presence of the customer. In some example embodiments, the system does not continually calculate the time from the customer's current location to the restaurant location, but instead is provided with a predetermined distance range from the restaurant location: when the customer enters that range, the order system triggers preparation of the order.

In some example embodiments, mobile devices, vehicles, etc. having software reading at least one inertial sensor (such as accelerometer, gyro, etc.), and the customer inputs the location from which they will be departing. Once the software (such as a mobile app) detects steady motion of the mobile device or vehicle rate indicating the customer is driving, the software notifies the restaurant location. The restaurant location calculates (or has previously calculated) the distance from the customer's location to the restaurant location, as well as the time required for order preparation, and begins preparation of the order in time for it to be finished at or about the time the customer arrives.

EXAMPLE EMBODIMENTS

Example 1

In some example embodiments, a coffee shop with in-store service and a typical drive-through window is adapted for non-sequential order pick up. In some such example embodiments, the window is converted to order pick up only, or an additional order pick up only window is added. In either case, the order pick up window has direct access, and no microphone, and is designed to not be blocked by traffic that is ordering. In some alternative example embodiments, an ordering station is provided, such as by adapting the lanes to provide independent access to the pick-up window, and to the previous ordering station. The previous ordering station is converted to an independent order placement station, at which customers may place (and, in some embodiments, pay for) their order, and then exit the ordering station and lane, and enter parking or queuing spaces until their order is ready, at which point they enter a non-sequential drive-through lane to approach the order pick up window.

Example 2

In some example embodiments, a primarily dine-in restaurant utilizes the ordering system. In some such example embodiments, customers place at least some portion of their order, including a desired dining time, via an internet-connected device or mobile device, by phone, etc., and receives an expected dining time. The ordering system provides the expected dining time by taking into account the current number of tables and seating available, current and expected number of customers, wait staff levels, etc. The restaurant prepares the order, sets the table, and is ready for the customers when they arrive at or near the expected dining time. More than just reserving a table, the ordering system allows the table to be reserved easily, without having to call or stop by the restaurant. It also allows the restaurant to maximize usage of available seating, tables, staff, etc. by reserving for a more accurate time and providing an accurate expected dining time. It may reduce the inconvenience and annoyance to customers of standing in line waiting to be seated, by providing them an accurate expected dining time.

Example 3

Some example embodiments comprise a convenience store or travel center that serves food, such as sandwiches, hot dogs, breakfast pastries, tacos, hamburgers, desserts, etc. Customers can pre-order a menu item, or at least choose from a subset of the menu provided in the store. In some example embodiments, the store adds a non-sequential order pick up window and associated lane. In some example embodiments, the customer picks the order up in-store at a dedicated non-sequential pick up area. Accordingly, the customer can use time during travel to place the order, and minimize time waiting for a hot meal at the travel center, convenience store, etc.

Example 4

Some example embodiments comprise a restaurant offering a customizable build-your-own entree—such as build-your-own sandwiches, burritos, tacos, pizzas, hamburgers, salads, etc. The restaurant accepts pre-orders at least online or through a mobile device, including all or a subset of available customizations. Customers are able to place an order online, including their customizations, and receive an order-ready time (depending on various factors, including whether the order is placed with a desired pick up time or as an ASAP order). The restaurant provides a dedicated non-sequential order pick up area, non-sequential order pick up window, or both, where customers can pick up their order without waiting in line. This may provide an advantage for customers and restaurants in such locations, where the line typically moves more slowly because of the many choices customers must make during customization. Additionally, customers are easily able to distinguish when placing their order between free and add-on customizations, and the price of add-on customizations, without the annoyance of repeatedly asking restaurant staff or searching a menu or menu board.

Example 5

Some example embodiments of the present disclosure comprise a restaurant offering delivery of the order to the customer's desired location through at least one third-party food delivery service, either in combination with, or in place of, restaurant delivery staff. In some such example embodiments, the customer requests delivery (versus pick-up) when placing the order, or at some point after placing the order. The order system queues the order as discussed elsewhere herein, and schedules a driver to make the delivery with a third-party food delivery service (such as Favor™ GrubHub™, etc.). The driver comes to a non-sequential order pick up area (such as a common pic up window for both drivers and customers, or a dedicated driver pick up window), picks up the order, and delivers it to the restaurant.

In various example embodiments, the order is initially placed through the restaurant's order system, or through a third party order system (such as for a food delivery service) and then transferred to the restaurant order system. In some example embodiments, the restaurant is a food delivery service only location, having a pick up window or area (preferably a drive-through window) with non-sequential access for food delivery service drivers.

In some example embodiments, an additional calculated time—driver summons—is provided that is calculated at least based on available drivers, time required for drivers to arrive at the restaurant, and order preparation time. In some such example embodiments, the order system obtains information on present driver availability and location through at least one connection to food delivery service systems (such as through an application programming interface). In some such example embodiments, the order system does not use or calculate the driver summons time. In some example embodiments, the order system queues the order, and reserves a pick up time with a driver. In some example embodiments, the order system calculates driver summons time based on the likelihood of a driver being available within a given driving distance (or time, or both), and triggers summons of a driver when the driver summons time is reached. The driver summons time may be before order production begins, or afterwards, depending on the calculated production time of the order, and the estimated time for a driver to arrive.

Example 6

Some example embodiments of the present disclosure comprise a fast-food type restaurant that traditionally does not have a drive-through option, such as many quick-preparation or pre-prepared pizza locations. Such restaurant locations can add a non-sequential access order pick up window (in some such embodiments, the window having no microphone and no provision for placing or paying for an order) and mobile/online ordering, such that customers can order online, and pick up their order at a pick up window. While many such locations would not be able to add a traditional drive through window due to space constraints, the present disclosure, as discussed elsewhere herein, allows the addition of a drive-through pick up window with minimal impacts on available space.

Example 7

One or more example embodiments may be advantageous for locations with restricted space insufficient for current requirements for traditional drive-through order and pick up lines. For example, a restaurant seeking to utilize a location on a corner lot that is ideal for a fast casual food drive-through pick up location due to proximity to target clientele, but prevented from doing so by having a lot too small for the required number of vehicles in a sequential access drive-through lane, can apply an example embodiment in order to utilize the location for drive-through pick up.

In one particular such situation, a location is currently being used for both customer sit down and inside customer pick up, as well as for in-store delivery driver pick up. Customer drive-through order pick up is planned to add to the location, but the lot size, surrounding development, and city requirements prevented a standard, sequential drive-through lane and window to be added, because the length of the lane required to accommodate the number of vehicles at one time required by the city (in order to prevent the wait line from spilling onto the road or adjoining businesses) is too large for the lot. The location incorporates a non-sequential drive-through order pick up window configured only for pick-up of previously placed orders, successfully eliminating the need for a long, space-inefficient sequential drive-through lane. Additionally, the location offers the convenience and speed advantages of the non-sequential order pick up lane and window to its customers, offering the convenience of picking up orders without exiting the vehicle, and the speed of entering the pick-up lane and approaching the window only when the order is ready, avoiding trapping customers in a lane and requiring them to wait on slow order placement or preparation of large orders.

Example 8

Some example embodiments comprise a plurality of food trucks utilizing one or more ordering systems, the ordering system(s) having a common customer interface. Customers order online, through a mobile device, or at a kiosk, at least by selecting the food truck, and then placing an order with that food truck. The common customer interface passes the order to the individual food truck's ordering system for production queuing, and provides the customer an order-ready time for pick up. The customer can then go to the specified food truck to pick up their food in a non-sequential pick up manner at a given time. Food trucks particularly lend themselves to providing a dedicated pre-order pick up area (such as a window, or part of a large window or bay), as they are typically not drive-through. In some embodiments, having food trucks that move from place to place, the common customer interface provides the customer with the location of the food truck at the time the order is to be picked up.

In such example embodiments, customers are able to more fully engage the offerings of food trucks with greater convenience, by not having to find the food truck and peruse the menu at any given time. Instead, the customer can access the food truck's menu electronically, place the order, and then pick up the order at the present location of the food truck. This may be useful in crowded cities and areas where food trucks are often popular. Additionally, such example embodiments are useful to food trucks to extend their customer base to people who do not have the time to track down the food truck, place an order, and wait for preparation.

Example 9

Some example embodiments comprise a travel center, visitor's bureau, university campus, library, employee lounge, or other common area, having a kiosk, a guest Wi-Fi with a landing web page, or other such commonly accessed interface. The interface provides a selection of local restaurants to choose from, each having ordering systems providing production timing and slip-logic control of orders, and providing non-sequential order pick up. The ordering systems have a common user interface, or application programming interface that is used by the commonly accessed interface (CAI). A user selects a restaurant on the CAI, and places an order, as discussed elsewhere herein. The CAI provides an order ready (or order delivery, if delivery is chosen) timing estimate which, in preferred embodiments, is generated by the restaurant's ordering system and passed to the CAI to display to the customer. If order pick up is chosen, the CAI provides the customer the restaurant location for pick up. Such example embodiments may be useful for customers who wish to quickly access restaurants serving a common area, without having to filter through internet search results, a phonebook, or the like, for a reasonable driving, walking, or delivery time. Additionally, it may provide a marketing opportunity for restaurants in an area to make their location and menu accessible to a relatively large, targeted customer base.

Example 10

The present disclosure is advantageous in various embodiments for estimating order completion times.

According to one or more example embodiments, an order completion time, which a customer order is anticipated to be completed may be estimated and transmitted to a selected external delivery system. For example, an order completion time may be determined based on one or more of at least one ordered menu item, an estimated preparation time corresponding to the at least one menu item, a number of employees preparing customer orders, a number of customer orders currently in preparation, a number of menu items currently in preparation, and a summed estimation time corresponding to a sum of estimated preparations times corresponding to the menu items currently in preparation. Each menu item which is available for order may be previously associated with an estimated preparation time based on, for example, a timed preparation of the item, or an average or other calculation based on historical preparation times for the item. The number of employees preparing orders may be input by a restaurant or restaurant employee or may be determined based on one or more of a date, a time of day, or a shift, and a known number of employees associated therewith. The number of menu items currently in preparation may be input by a restaurant or restaurant employee or may be determined by the system based on previous customer orders. The summed estimation time may be calculated for each specific combination of estimation times for orders currently in preparation. Other factors which may be taken into account may include, but are not limited to, the time of day, a day of the week, employee shift information, a requested delivery time, and a requested delivery location.

The menu items available for order may include food items and beverage items, and a fixed estimated preparation time may be set for all beverage items.

The external delivery system to which the order completion time is transmitted may be selected based on an availability of external delivery systems and/or their drivers which may be determined based on a determined proximity, at the order completion time, or an available driver to a preparation location of the at least one menu item. Furthermore, a particular driver within an external delivery system may be identified and instructed to pick up and delivery the at least one menu item. The selected external delivery system may provide driver information, such as one or more of a driver identity, driver vehicle information, and a vehicle license plate number. An estimated time of arrival of the driver may be transmitted to the system from the driver or the selected external delivery system.

CONCLUSION

The disclosure claimed has been herein disclosed sufficiently for persons skilled in the art to comprehend and practice. While the disclosure may be susceptible to various modifications and alternative forms, specific embodiments have been shown by way of example in the drawings and have been described in detail herein. The various embodiments, examples, and illustrations disclosed herein, while representing the best and various alternative modes of carrying out the disclosure as currently contemplated by the inventors, are by no means limiting or exhaustive, but serve as an aid to comprehending the full nature and scope of the disclosure.

It should be understood that the disclosure is not intended to be limited to the particular forms disclosed. Rather, the disclosure is to cover all modifications, equivalents, and alternatives falling within the spirit and scope of the disclosure as defined by the following appended claims. Various other embodiments will become apparent which fall within the scope of this disclosure and claims. It should be noted that section titles or headers are provided for convenience only, and are not to be taken as limiting the scope of the descriptions thereunder.

The methods and operations described above with respect to example embodiments can be implemented, at least in part, in digital electronic circuitry, analog electronic circuitry, or in computer hardware, firmware, software, or a combination thereof. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or other device or on multiple device at one site or distributed across multiple sites and interconnected by a communication network. Also, functional programs, codes, and code segments for accomplishing features described herein can be easily developed by programmers skilled in the art. Method steps associated with the example embodiments can be performed by one or more programmable processors executing a computer program, code or instructions to perform functions (e.g., by operating on input data and/or generating an output). Method steps can also be performed by, and apparatuses described herein can be implemented as, special purpose logic circuitry, e.g., a field programmable gate array (FPGA) or an application-specific integrated circuit (ASIC), for example.

A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory (ROM) (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Computer-readable non-transitory media includes all types of computer readable media, including magnetic storage media, optical storage media, flash media and solid state storage media. It should be understood that software can be installed in and sold with a central processing unit (CPU) device. Alternately, the software can be obtained and loaded into the CPU device, including obtaining the software through physical medium or distribution system, including, for example, from a server owned by the software creator or from a server not owned but used by the software creator. The software can be stored on a server for distribution over the Internet, for example.

It may be understood that the exemplary embodiments described herein may be considered in a descriptive sense only and not for purposes of limitation. Descriptions of features or aspects within each exemplary embodiment may be considered as available for other similar features or aspects in other exemplary embodiments.

While exemplary embodiments have been described with reference to the figures, it will be understood by those of ordinary skill in the art that various changes in form and details may be made therein without departing from the spirit and scope as defined by the following claims.

Consistent with the above disclosure, the examples of systems and method enumerated in the following clauses are specifically contemplated and are intended as a non-limiting set of examples.

Clause 1. A method including: a processor receiving a customer order input, the order input including at least one ordered menu item; the processor obtaining a set of production timing and slip logic (PTSL) rules for generating an order completion time as a function of PTSL input including one or more of: the at least one ordered menu item, an estimated preparation time corresponding to the at least one menu item, a number of employees preparing customer orders, a number of customer orders currently in preparation, a number of menu items currently in preparation, and a summed estimation time corresponding to a sum of estimated preparation times corresponding to the menu items currently in preparation; the processor applying the PTSL rules and thereby calculating the order completion time; and the processor transmitting the order completion time to a selected external delivery system.

Clause 2. The method of any foregoing clause, where the at least one ordered menu item comprises one or more of a food item and a beverage item.

Clause 3. The method of any foregoing clause, where the order input further comprises a requested delivery time and a requested delivery location, and the PTSL input further comprises at least one of: the requested delivery time and the requested delivery location.

Clause 4. The method of any foregoing clause, further including: the processor selecting the selected external delivery system from a plurality of external delivery systems based on a determined proximity, at the order completion time, of an available driver to a preparation location of the at least one ordered menu item.

Clause 5. The method of any foregoing clause, further including the processor coordinating with the selected external delivery system and thereby identifying, based on the order completion time, a driver to pick up the at least one ordered menu item.

Clause 6. The method of any foregoing clause, further including the processor receiving, from the selected external delivery system, driver delivery information comprising at least one of: an identity of the driver, a vehicle of the driver, and a license plate number of the vehicle.

Clause 7. The method of any foregoing clause, further including the processor receiving, from the external delivery system, an estimated time of arrival of the driver.

Clause 8. A system including: a memory storing instructions; and a processor communicatively coupled to the memory and configured to execute the instructions and thereby perform a method including: receiving a customer order input, the order input including at least one ordered menu item; obtaining a set of production timing and slip logic (PTSL) rules for generating an order completion time as a function of PTSL input including one or more of: the at least one ordered menu item, an estimated preparation time corresponding to the at least one menu item, a number of employees preparing customer orders, a number of customer orders currently in preparation, a number of menu items currently in preparation, and a summed estimation time corresponding to a sum of estimated preparation times corresponding to the menu items currently in preparation; applying the PTSL rules and thereby calculating the order completion time; and transmitting the order completion time to a selected external delivery system.

Clause 9. The system of any foregoing clause, where the at least one ordered menu item comprises one or more of a food item and a beverage item.

Clause 10. The system of any foregoing clause, where the order input further comprises a requested delivery time and a requested delivery location, and the PTSL input further comprises at least one of: the requested delivery time and the requested delivery location.

Clause 11. The system of any foregoing clause, where the method further includes selecting the selected external delivery system from a plurality of external delivery systems based on a determined proximity, at the order completion time, of an available driver to a preparation location of the at least one ordered menu item.

Clause 12 The system of any foregoing clause, where the method further includes coordinating with the selected external delivery system and thereby identifying, based on the order completion time, a driver to pick up the at least one ordered menu item.

Clause 13 The system of any foregoing clause, where the method further includes receiving, from the selected external delivery system, driver delivery information comprising at least one of: an identity of the driver, a vehicle of the driver, and a license plate number of the vehicle.

Clause 14. The system of any foregoing clause, where the method further includes receiving, from the external delivery system, an estimated time of arrival of the driver.

Clause 15. A non-transitory computer-readable memory storing thereon instructions that, when executed by a processor cause the processor to perform an ordering method including: receiving a customer order input, the order input including at least one ordered menu item; obtaining a set of production timing and slip logic (PTSL) rules for generating an order completion time as a function of PTSL input including one or more of: the at least one ordered menu item, an estimated preparation time corresponding to the at least one menu item, a number of employees preparing customer orders, a number of customer orders currently in preparation, a number of menu items currently in preparation, and a summed estimation time corresponding to a sum of estimated preparation times corresponding to the menu items currently in preparation; applying the PTSL rules and thereby calculating the order completion time; and transmitting the order completion time to a selected external delivery system.

Clause 16. The non-transitory computer-readable memory of any foregoing clause, where the at least one ordered menu item includes one or more of a food item and a beverage item.

Clause 17. The non-transitory computer-readable memory of any foregoing clause, where the order input further includes a requested delivery time and a requested delivery location, and the PTSL input further includes at least one of: the requested delivery time and the requested delivery location.

Clause 18. The non-transitory computer-readable memory of any foregoing clause, where the ordering method further includes selecting the selected external delivery system from a plurality of external delivery systems based on a determined proximity, at the order completion time, of an available driver to a preparation location of the at least one ordered menu item.

Clause 19. The non-transitory computer-readable memory of any foregoing clause, where the ordering method further includes coordinating with the selected external delivery system and thereby identifying, based on the order completion time, a driver to pick up the at least one ordered menu item.

Clause 20. The non-transitory computer-readable memory of any foregoing clause, where the ordering method further includes receiving, from the selected external delivery system, driver delivery information including at least one of: an identity of the driver, a vehicle of the driver, and a license plate number of the vehicle.

Clause 21. The non-transitory computer-readable memory of any foregoing clause, where the ordering method further includes receiving, from the external delivery system, an estimated time of arrival of the driver.

What is claimed is:

1. An ordering method comprising:
    a processor receiving a customer order input, the order input comprising at least one ordered menu item;
    the processor obtaining a set of production timing and slip logic (PTSL) rules for generating an order completion time as a function of PTSL input comprising one or more of: the at least one ordered menu item, an estimated preparation time corresponding to the at least one menu item, a number of employees preparing customer orders, a number of customer orders currently in preparation, a number of menu items currently in preparation, and a summed estimation time corresponding to a sum of estimated preparation times corresponding to the menu items currently in preparation;
    the processor applying the PTSL rules and thereby calculating the order completion time; and
    the processor transmitting the order completion time to a selected external delivery system.

2. The ordering method according to claim 1, wherein the at least one ordered menu item comprises one or more of a food item and a beverage item.

3. The ordering method according to claim 1, wherein the order input further comprises a requested delivery time and a requested delivery location, and the PTSL input further comprises at least one of: the requested delivery time and the requested delivery location.

4. The ordering method according to claim 1, further comprising:
    the processor selecting the selected external delivery system from a plurality of external delivery systems based on a determined proximity, at the order completion time, of an available driver to a preparation location of the at least one ordered menu item.

5. The ordering method according to claim 1, further comprising:
    the processor coordinating with the selected external delivery system and thereby identifying, based on the order completion time, a driver to pick up the at least one ordered menu item.

6. The ordering method according to claim 5, further comprising:
    the processor receiving, from the selected external delivery system, driver delivery information comprising at least one of: an identity of the driver, a vehicle of the driver, and a license plate number of the vehicle.

7. The ordering method according to claim 5, further comprising:

the processor receiving, from the external delivery system, an estimated time of arrival of the driver.

8. An ordering system comprising:
a memory storing instructions; and
a processor communicatively coupled to the memory and configured to execute the instructions and thereby perform a method comprising:
receiving a customer order input, the order input comprising at least one ordered menu item;
obtaining a set of production timing and slip logic (PTSL) rules for generating an order completion time as a function of PTSL input comprising one or more of: the at least one ordered menu item, an estimated preparation time corresponding to the at least one menu item, a number of employees preparing customer orders, a number of customer orders currently in preparation, a number of menu items currently in preparation, and a summed estimation time corresponding to a sum of estimated preparation times corresponding to the menu items currently in preparation;
applying the PTSL rules and thereby calculating the order completion time; and
transmitting the order completion time to a selected external delivery system.

9. The system according to claim 8, wherein the at least one ordered menu item comprises one or more of a food item and a beverage item.

10. The system according to claim 8, wherein the order input further comprises a requested delivery time and a requested delivery location, and the PTSL input further comprises at least one of: the requested delivery time and the requested delivery location.

11. The system according to claim 8, the method further comprising:
selecting the selected external delivery system from a plurality of external delivery systems based on a determined proximity, at the order completion time, of an available driver to a preparation location of the at least one ordered menu item.

12. The system according to claim 8, the method further comprising:
coordinating with the selected external delivery system and thereby identifying, based on the order completion time, a driver to pick up the at least one ordered menu item.

13. The system according to claim 12, the method further comprising:
receiving, from the selected external delivery system, driver delivery information comprising at least one of: an identity of the driver, a vehicle of the driver, and a license plate number of the vehicle.

14. The system according to claim 12, the method further comprising:
receiving, from the external delivery system, an estimated time of arrival of the driver.

15. A non-transitory computer-readable memory storing thereon instructions that, when executed by a processor cause the processor to perform an ordering method comprising:

receiving a customer order input, the order input comprising at least one ordered menu item;
obtaining a set of production timing and slip logic (PTSL) rules for generating an order completion time as a function of PTSL input comprising one or more of: the at least one ordered menu item, an estimated preparation time corresponding to the at least one menu item, a number of employees preparing customer orders, a number of customer orders currently in preparation, a number of menu items currently in preparation, and a summed estimation time corresponding to a sum of estimated preparation times corresponding to the menu items currently in preparation;
applying the PTSL rules and thereby calculating the order completion time; and
transmitting the order completion time to a selected external delivery system.

16. The non-transitory computer-readable memory according to claim 15, wherein the at least one ordered menu item comprises one or more of a food item and a beverage item.

17. The non-transitory computer-readable memory according to claim 15, wherein the order input further comprises a requested delivery time and a requested delivery location, and the PTSL input further comprises at least one of: the requested delivery time and the requested delivery location.

18. The non-transitory computer-readable memory according to claim 15, the ordering method further comprising:
selecting the selected external delivery system from a plurality of external delivery systems based on a determined proximity, at the order completion time, of an available driver to a preparation location of the at least one ordered menu item.

19. The non-transitory computer-readable memory according to claim 15, the ordering method further comprising:
coordinating with the selected external delivery system and thereby identifying, based on the order completion time, a driver to pick up the at least one ordered menu item.

20. The non-transitory computer-readable memory according to claim 19 the ordering method further comprising:
receiving, from the selected external delivery system, driver delivery information comprising at least one of: an identity of the driver, a vehicle of the driver, and a license plate number of the vehicle.

21. The non-transitory computer-readable memory according to claim 19 the ordering method further comprising:
receiving, from the external delivery system, an estimated time of arrival of the driver.

* * * * *